(12) United States Patent
Nishiuchi et al.

(10) Patent No.: US 6,771,587 B2
(45) Date of Patent: Aug. 3, 2004

(54) OPTICAL INFORMATION RECORDING MEDIUM WITH PLURAL INFORMATION LAYERS

(75) Inventors: Kenichi Nishiuchi, Moriguchi (JP); Ken'ichi Nagata, Nishinomiya (JP); Nobuo Akahira, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/413,934

(22) Filed: Apr. 14, 2003

(65) Prior Publication Data

US 2003/0206504 A1 Nov. 6, 2003

Related U.S. Application Data

(62) Division of application No. 10/162,392, filed on Jun. 3, 2002, now Pat. No. 6,611,491, which is a division of application No. 09/599,189, filed on Jun. 22, 2000, now Pat. No. 6,434,095, which is a division of application No. 09/471,527, filed on Dec. 27, 1999, now Pat. No. 6,226,239, which is a continuation of application No. 08/716,021, filed on Sep. 19, 1996, now Pat. No. 6,027,594, which is a division of application No. 08/628,596, filed on Apr. 5, 1996, now Pat. No. 5,764,619.

(30) Foreign Application Priority Data

Apr. 7, 1995 (JP) ............................................. 7-082248
Aug. 23, 1995 (JP) ............................................. 7-214326

(51) Int. Cl.$^7$ ................................................ G11B 3/70
(52) U.S. Cl. .................................... 369/283; 369/275.4
(58) Field of Search ............................... 369/94, 275.1, 369/275.4, 283, 284, 286, 288

(56) References Cited

U.S. PATENT DOCUMENTS 3,855,426 A 12/1974 Bouwhuis
4,090,031 A 5/1978 Russell
4,097,895 A 6/1978 Spong
4,188,433 A 2/1980 Dijkstra et al.

(List continued on next page.)

FOREIGN PATENT DOCUMENTS

| EP | 0 426 409 | 5/1991 |
|---|---|---|
| EP | 0 437 223 | 7/1991 |
| EP | 0 443 797 | 8/1991 |
| EP | 0 446 679 | 9/1991 |
| EP | 0 520 619 | 12/1992 |
| EP | 0 566 107 | 10/1993 |
| EP | 0 605 924 | 7/1994 |
| GB | 2 130 423 | 5/1984 |
| JP | 60-202545 | 10/1985 |
| JP | 62-298934 | 12/1987 |
| JP | 63-282940 | 11/1988 |
| JP | 1-109537 | 4/1989 |
| JP | 5-159326 | 6/1993 |
| JP | 7-73507 | 3/1995 |

Primary Examiner—Paul W. Huber
(74) Attorney, Agent, or Firm—Merchant & Gould P.C.

(57) ABSTRACT

In an optical information recording medium having at least two information layer, guide grooves for tracking or sample pits or information pits corresponding to information signals are formed on a surface of a first substrate. A first information layer formed by a thin film for reflecting a portion of a light beam made incident on the first substrate and permitting penetration of a portion of the light beam is formed on a surface of the first substrate. Guide grooves for tracking or information pits corresponding to information signals are formed on a surface of a second substrate. A second information layer having a reflectance higher than that of the first information layer is formed on a surface of the second substrate. Between the first information layer and the second information layer, there is formed a transparent separation layer for positioning the first information layer and the second information layer to be spaced a predetermined distance apart from each other.

7 Claims, 21 Drawing Sheets

U.S. PATENT DOCUMENTS

| | | |
|---|---|---|
| 4,310,919 A | 1/1982 | Slaten |
| 4,450,553 A | 5/1984 | Holster et al. |
| 4,800,112 A | 1/1989 | Kano et al. |
| 4,815,060 A | 3/1989 | Nomura |
| 4,866,672 A | 9/1989 | Terao et al. |
| 4,917,751 A | 4/1990 | Ohta et al. |
| 4,990,208 A | 2/1991 | Kano |
| 5,013,107 A | 5/1991 | Biles |
| 5,023,439 A | 6/1991 | Noda et al. |
| 5,059,473 A | 10/1991 | Takahashi et al. |
| 5,093,174 A | 3/1992 | Suzuki et al. |
| 5,126,996 A | 6/1992 | Iida et al. |
| 5,200,948 A | 4/1993 | Goldberg et al. |
| 5,235,591 A | 8/1993 | Nakamura et al. |
| 5,251,198 A | 10/1993 | Strickler |
| 5,263,011 A | 11/1993 | Maeda et al. |
| 5,318,653 A | 6/1994 | Toide et al. |
| 5,373,499 A | 12/1994 | Imaino et al. |
| 5,381,401 A | 1/1995 | Best et al. |
| 5,428,597 A | 6/1995 | Satoh et al. |
| 5,449,590 A | 9/1995 | Imaino et al. |
| 5,485,452 A | 1/1996 | Maeda |
| 5,499,231 A | 3/1996 | Fennema et al. |
| 5,511,057 A | 4/1996 | Holtslag et al. |
| 5,513,170 A | 4/1996 | Best et al. |
| 5,540,966 A | 7/1996 | Hintz |
| 5,555,537 A | 9/1996 | Imaino et al. |
| 5,627,816 A | 5/1997 | Ito et al. |
| 5,745,473 A | 4/1998 | Best et al. |
| 5,764,621 A | 6/1998 | Choi |
| 5,768,221 A | 6/1998 | Kasami et al. |
| 5,808,989 A | 9/1998 | Ueki et al. |
| 5,828,648 A | 10/1998 | Takasu et al. |
| 6,031,813 A | 2/2000 | Moriya et al. |

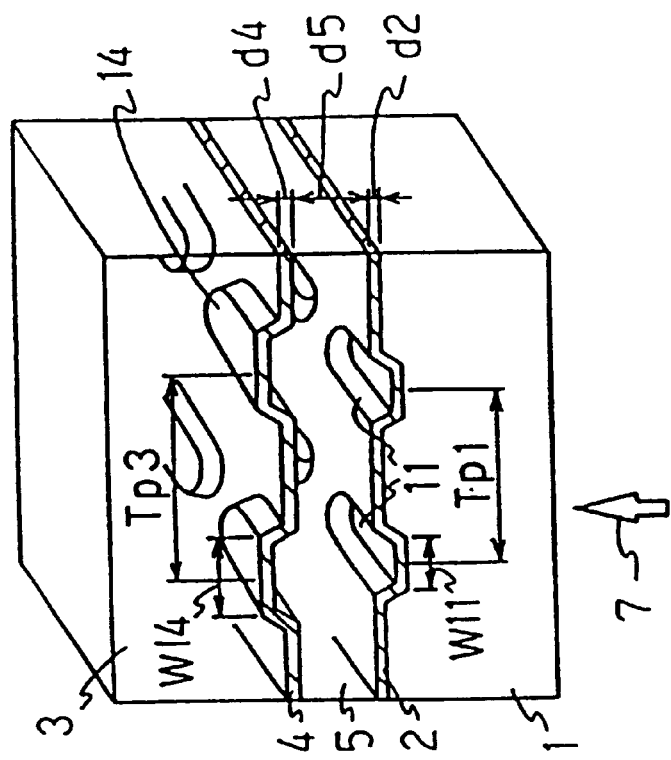
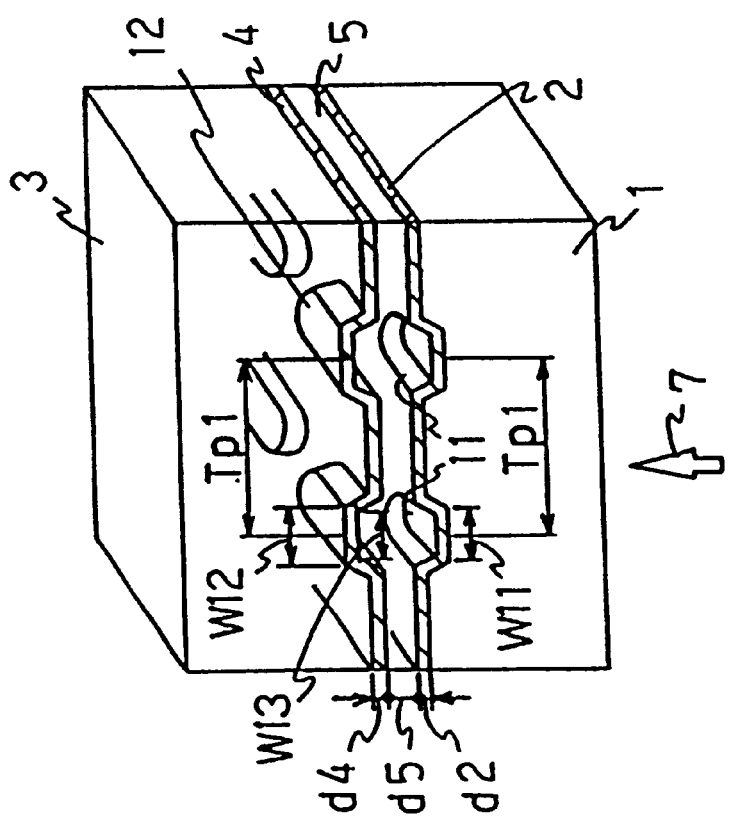
FIG. 2(a)
FIG. 2(b)

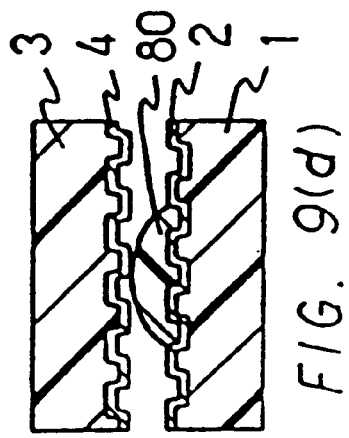
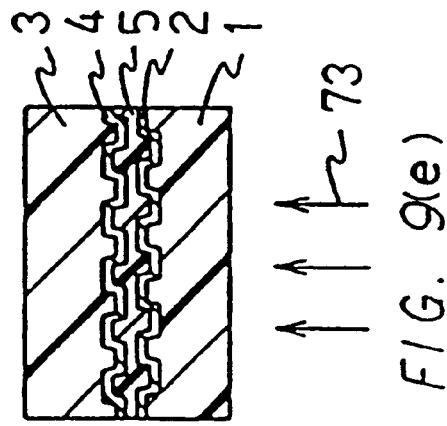
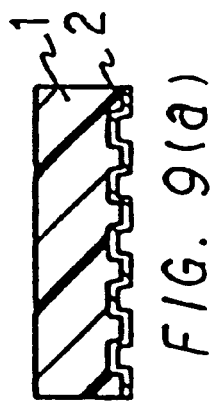
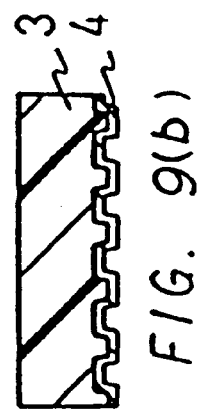
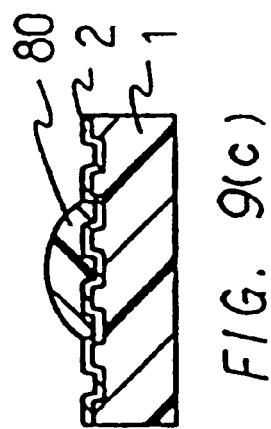

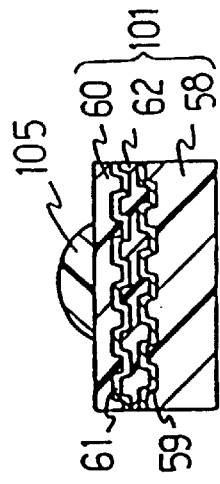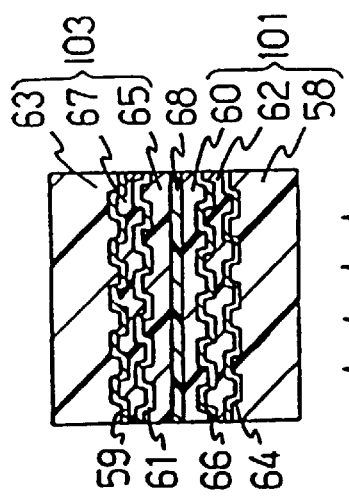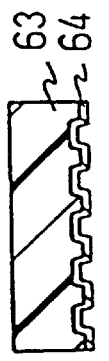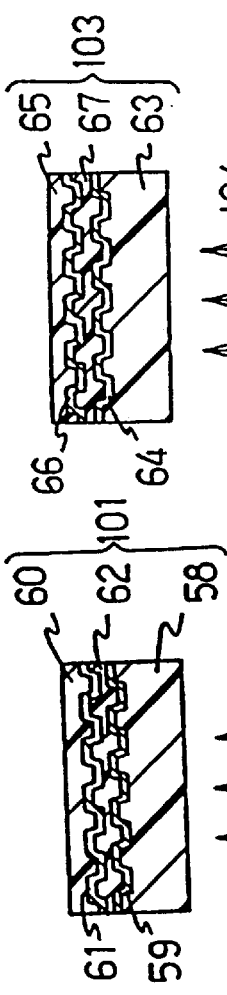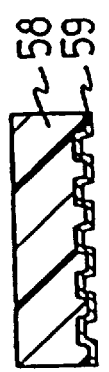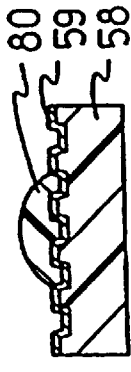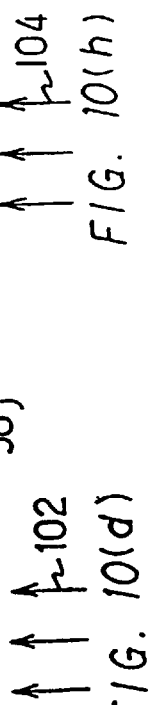
FIG. 10(a) FIG. 10(b) FIG. 10(c) FIG. 10(d) FIG. 10(e) FIG. 10(f) FIG. 10(g) FIG. 10(h) FIG. 10(i) FIG. 10(j)

OPTICAL INFORMATION RECORDING MEDIUM WITH PLURAL INFORMATION LAYERS

This application is a divisional of application Ser. No. 10/162,392, filed Jun. 3, 2002, now U.S. Pat. No. 6,611,491, which is a Divisional of application Ser. No. 09/599,189 filed Jun. 22, 2000, now U.S. Pat. No. 6,434,095, which is a Divisional of application Ser. No. 09/471,527 filed Dec. 27, 1999, now U.S. Pat. No. 6,226,239, which is a Continuation of application Ser. No. 08/716,021, filed Sep. 19, 1996, now U.S. Pat. No. 6,027,594, which is a Divisional of application Ser. No. 08/628,596, filed Apr. 5, 1996, now U.S. Pat. No. 5,764,619, which applications(s) are incorporated herein by reference.

FIELD OF THE INVENTION

The present invention relates to an optical information recording medium capable of reproducing information signals or recording and reproducing information signals by using light beams, a manufacturing method therefor, a manufacturing apparatus therefor and an optical information recording and reproducing apparatus making use thereof, and more particularly to an optical information recording medium having a multilayer structure including a plurality of information layers, a manufacturing method therefor, a manufacturing apparatus therefor and an optical information recording and reproducing apparatus making use thereof.

DESCRIPTION OF THE PRIOR ART

Hitherto, an optical information recording medium has been known which is capable of optically recording information signals or reproducing recorded information signals and which is formed into an optical disk, an optical card or the like. In general, the foregoing recording medium uses a semiconductor laser unit as a light source. By irradiating the recording medium with light beams finely converged by a lens, information signals can be recorded on the recording medium in a large quantity, and information signals recorded on the recording medium can be reproduced.

At present, investigations have been performed to further enlarge the recording capacity of the recording medium of the foregoing type. To raise the recording density, it is effective to improve the reproducing resolution by finely limiting the light beam. In order to achieve this, investigations have been performed such that the wavelength of the light beam is shortened or the numerical aperture (NA) is enlarged. Moreover, reproducing methods have been investigated in which the focusing or tracking accuracy is improved and crosstalk between signals is prevented so as to allow the recording surface density to be raised.

Although employment of the foregoing methods enables the recording capacity per unit area to be somewhat enlarged, a structure having only a single information layer for recording information encounters a limitation when the recording density is intended to be raised.

If a plurality of information layers for recording information are provided, it can be expected that the recording capacity can be multiplied. A method for manufacturing an optical disk having the multilayer structure has been disclosed in, for example, U.S. Pat. No. 5,126,996.

A process for manufacturing the foregoing optical disk will now be described. As shown in FIG. 21(a), a first information layer 212 is formed on the surface of a substrate 211 manufactured by an injection molding method or the like and having information pits. Then, as shown in FIG. 21(b), a photosetting resin 214 is applied to the upper surface of a master 213 having information pits. Then, as shown in FIG. 21(c), the surface of the first information layer 212 on the substrate 211 having the information pits and the surface of the master 213 having the information pits are caused to face each other. Then, in a state where the substrate 211 is pressed, the photosetting resin 214 is irradiated with light from a position on the outside of the master 213. As a result, the photosetting resin 214 is set so that the photosetting resin 214 is adhesive-bonded to the first information layer 212. Then, as shown in FIG. 21(d), the master 213 is removed from the photosetting resin 214. As a result, a resin layer having information pits on the surface thereof and composed of the photosetting resin 214 can be formed. Then, as shown in FIG. 21(e), a second information layer 215 is formed on the resin layer (made of the photosetting resin 214). Finally, as shown in FIG. 21(f), a protective coating layer 206 is formed on the second information layer 215. As a result of the foregoing process, an optical disk having a double-layer structure can be obtained.

However, when the master 213 is separated from the photosetting resin 214 (see FIG. 21(d)), the foregoing conventional manufacturing method can involves separation being easily taking place at the interface between the first information layer 212 and the substrate 211 or the resin layer (made of the photosetting resin 214). Thus, there arises a problem in that the manufacturing yield has been unsatisfactory. The reason for this can be considered that the adhesivity between the master 213 and the resin layer (made of the photosetting resin 214) is made to be greater than that between the first information layer 212 and the substrate 211 or that between the first information layer 212 and the resin layer (made of the photosetting resin 214).

In a case where the substrate 211 is made of a resin, change in the environmental temperature or in the humidity sometimes raises a problem in that the manufactured optical disk can be deformed or an error occurs in reproducing the signals.

Moreover, an apparatus of a type for reproducing information signals from a plurality of information layers has a problem in that the servo operation becomes instable due to an influence of light reflected by an information layer other than the subject information layer.

SUMMARY OF THE INVENTION

The present invention was found to overcome the foregoing problems experienced with the conventional structure, and, therefore, an object of the present invention is to provide an optical information recording medium having a multilayer structure which cannot easily be deformed due to change in the environment, a manufacturing method therefor, a manufacturing apparatus therefor and an apparatus for optically recording and reproducing information.

To achieve the foregoing object, according to one aspect of the present invention, there is provided an optical information recording medium having two different information layers and capable of reproducing information signals from the information layers, recording information signals on the information layers that can reproduce the recorded information signals when irradiated with a light beam, the optical information recording medium comprising: a first substrate having, on one side thereof, one or more selected from the group consisting of information pits corresponding to information signals, guide grooves for tracking and sample pits; a first information layer formed on either surface of the first substrate and having a predetermined transmissivity and a predetermined reflectance with respect to the light beam; a second substrate having, on one side thereof, one or more selected from a group consisting of information pits corresponding to information signals, guide grooves for tracking and sample pits; a second information layer formed on either surface of the second substrate and having a predetermined reflectance; and a separation layer formed between the first information layer and the second information layer that is transparent with respect to the light beam. The structure of the optical information recording medium provides a double-layer recording medium that is capable of reproducing information signals from the first and second information layers, recording information signals on the first and second information layers and reproducing recorded information signals.

It is preferable that the optical information recording medium according to the present invention has a structure such that the thickness of the first substrate is substantially the same as the thickness of the second substrate. As a result of the preferred structure, a structure vertically symmetrical with respect to the separation layer can be formed. Therefore, even if stress or the like is generated in the substrate due to change in the temperature or the like when the optical information recording medium is manufactured, distortion can be compensated. Even if unusual deformation factors act on the two substrates due to change in the temperature or the humidity of the environment, deformation and warp can be inhibited. As a result, a structure durable against change in the environment can be obtained. Therefore, even if the first and second substrates are made of resin, deformation of the manufactured recording medium causing an error in reproducing a signal can be prevented.

It is preferable that in the optical information recording medium according to the present invention, the below mentioned formula is satisfied;

$$R1 \approx 1 - A1 + (2 \cdot R2)^{-1} - \{[1 - A1 + (2 \cdot R2)^{-1}]^2 - (1 - A1)^2\}^{0.5}$$

wherein R1 is a reflectance of the first information layer,
A1 is an absorption ratio of the first information layer, and
R2 is a reflectance of the second information layer with respect to the wavelength of the light beam used to reproduce the information.

It is preferable that the optical information recording medium has a structure such that the reflectance of the first information layer is 25% to 40%. As a result of the foregoing preferred structure, a recording medium having the first and second information layers, which are reproduction only information layers, can be obtained in which the amplitudes of the signals from the first information layer and those from the second information layer are similar to each other and the reproducing amplitude is satisfactorily large.

It is preferable that the optical information recording medium according to the present invention has a structure such that the second information layer includes a reflecting layer, a first dielectric-material layer, a recording layer and a second dielectric-material layer, which are sequentially laminated on the second substrate. According to the foregoing preferred structure, a second information layer, the information of which can be rewritten, can be obtained.

It is preferable that the optical information recording medium according to the present invention has a structure such that the first information layer has a coefficient of absorption which is substantially zero with respect to the light beam. According to the foregoing preferred structure, the quantity of the light that reaches the second information layer can be enlarged.

It is preferable that the optical information recording medium according to the present invention has a structure such that the first information layer includes at least two layers of thin films. According to the foregoing preferred structure, the reflectance of the first information layer can be enlarged and the quantity of the light that reaches the second information layer can be enlarged. In the foregoing case, it is preferable that the first information layer includes a first dielectric-material layer, a recording layer and a second dielectric-material layer, which are sequentially laminated on the first substrate. According to the foregoing preferred structure, a first information layer can be obtained on which information can be recorded or information of which can be rewritten.

It is preferable that the optical information recording medium according to the present invention has a structure such that both of the first and second substrates have information pits corresponding to information signals on either surface. According to the foregoing preferred structure, a recording medium having a large capacity can be obtained.

It is preferable that the optical information recording medium according to the present invention has a structure such that the first information layer is a reproduction only information layer and the second information layer is a recording and reproducing information layer. According to the foregoing preferred structure, light absorption of the reproduction only first information layer can be set to a low level. Moreover, since the influence of diffraction occurring due to information pits can be inhibited, information can be recorded or reproduced with small power.

It is preferable that the optical information recording medium according to the present invention has a structure such that the thickness of the separation layer is larger than the focal depth of an optical system for converging the light beam and smaller than the tolerance of a base allowed by the optical system. According to the foregoing preferred structure, information satisfactorily free from crosstalk can be reproduced from another information layer as long as the aberration of the light beam to be applied is small.

It is preferable that the optical information recording medium according to the present invention has a structure such that information pits or sample pits are formed on the first and second substrates and the shapes of the pits formed on the first substrate are different from the shapes of the pits formed on the second substrate. In the foregoing case, it is preferable that the width of the pit formed on the second substrate is larger than the width of the pit formed on the first substrate. According to the foregoing preferred structure, diffraction of light reflected from the first information layer and that from the second information layer can be made to correspond. Therefore, signals can be reproduced stably.

It is preferable that the optical information recording medium according to the present invention has a structure such that guide grooves are formed in the surfaces of the first and second substrates and the width of the guide groove formed in the second substrate is larger than the width of the guide groove formed in the first substrate. According to the foregoing preferred structure, the effect of the guide grooves formed in the surface of the first substrate and the effect of the guide grooves formed in the surface of the second substrate can be made to be the same.

It is preferable that the optical information recording medium according to the present invention has a structure such that information pits are formed on the surfaces of the first and second substrates and the density of the information pits formed on the second substrate per unit area is lower than the density of the information pits formed on the first substrate per unit area. According to the foregoing preferred structure, information can be reproduced satisfactorily from an information layer out of the focal depth of the optical system for converging the light beam.

It is preferable that the optical information recording medium according to the present invention has a structure such that sample pits or guide grooves are formed in the surfaces of the first and second substrates and the pitch of the sample pits or the guide grooves formed in the second substrate is shorter than the pitch of the sample pits or the guide grooves formed in the first substrate. According to the foregoing preferred structure, a recording medium can be obtained in which signals can be reproduced satisfactorily from an information layer out of the focal depth of the optical system for converging the light beam and signals can be recorded on the same.

It is preferable that the optical information recording medium according to the present invention has a structure such that information pits or sample pits are formed on the surfaces of the first and second substrates and the directions of the information pits are opposite to each other between the first substrate and the second substrate when viewed from a position upon which the light beam is made incident. According to the foregoing preferred structure, the material and molding process of the substrates can be made to be the same as well as the mastering process. As a result, it is only necessary to prepare two types of manufacturing apparatuses having the same function or one manufacturing apparatus can be used commonly when the substrates are manufactured. Thus, the cost of the facilities for manufacturing the substrates can be reduced.

It is preferable that the optical information recording medium according to the present invention has a structure such that the information pits, the guide grooves or the sample pits formed on the surfaces of the first and second substrates are formed into a spiral shape relative to the central portions of the first and second substrate and the shape of the spiral on the first substrate and the shape of the spiral on the second substrate are the same when viewed from a position upon which the light beam is made incident. According to the foregoing preferred structure, the light beam is moved in one direction from the inner portion to the outer portion or one direction from the outer portion to the inner portion regardless of the information layer having the information pits to which tracking has been made. In the case where the structure is employed in which the light beam is moved from the inner portion to the outer portion, a reproduction method may be employed in which administration information is detected in the inner portion of any of the information layers and an access is made to a required information region including the portion between the information layers. Therefore, it can be said that the foregoing structure is suitable for a recording medium capable of allowing a high speed access to the information layers.

It is preferable that a pair of the optical information recording mediums according to the present invention and an adhesive-bonding layer are provided and the second substrates of the pair of optical information recording mediums are adhesive-bonded to each other through the adhesive-bonding layer. According to the foregoing preferred structure, a recording medium having a four-layer structure can be obtained in which information can be recorded and reproduced from each of the information layers by irradiating the two sides with the light beams. In the foregoing case, it is preferable that the thicknesses of the first substrates of the pair of optical information recording mediums are substantially the same and the thicknesses of the second substrates of the pair of optical information recording mediums are substantially the same.

According to another aspect of the present invention, there is provided a method of manufacturing an optical information recording medium having two different information layers and capable of reproducing information signals from the information layers, recording information signals on the information layers and reproducing the recorded information signals when irradiated with a light beam. The method of manufacturing an optical information recording medium comprises: a first film-forming step of forming a first information layer having a predetermined transmissivity and a predetermined reflectance on a substrate having, on one side thereof, one or more selected from the group consisting of information pits corresponding to information signals, guide grooves for tracking and sample pits; a second film-forming step of forming a second information layer having a predetermined reflectance on a second substrate having, on one side thereof, one or more selected from a group consisting of information pits corresponding to information signals, guide grooves for tracking and sample pits; an applying step of applying a resin layer, which is transparent with respect to the light beam, to the upper surface of the first information layer or the second information layer; an adhesive-bonding step of causing the first information layer and the second information layer to face each other and adhesive-bonding the first and second information layers to each other through the resin layer. According to the structure of the method of manufacturing the optical information recording medium, the step of removing the master is not required. By simply adhesive-bonding to each other the substrates having the information pits formed previously, a recording medium having a double-layer structure can be obtained. As a result, the manufacturing yield can be improved.

It is preferable that the method of manufacturing an optical information recording medium according to the present invention has a structure such that the thickness of the first substrate is substantially the same as the thickness of the second substrate.

It is preferable that the method of manufacturing an optical information recording medium according to the present invention further comprises a pressing step of pressing the first and second substrates from the outsides of the first and second substrates. According to the foregoing, a resin layer satisfactorily free from irregularity in thickness can be formed.

It is preferable that in the method of manufacturing an optical information recording medium according to the present invention a photosetting resin is used to form the resin layer and the resin layer is irradiated with light from a position on the outside of the first substrate so as to set the resin layer while applying pressure to the outsides of the first and second substrates. According to the foregoing preferred structure, a resin layer satisfactorily free from irregularity in thickness can be formed in a short time.

It is preferable that the method of manufacturing an optical information recording medium according to the present invention further comprises an applying step of applying an adhesive-bonding layer, which is transparent with respect to the light beam, to the upper surface of either of the second substrates of a pair of optical information recording mediums obtained by the method of manufacturing an optical information recording medium according to the present invention; and an adhesive-bonding step of causing the second substrates of the pair of optical information recording mediums to face each other and adhesive-bonding the second substrates to each other through the resin layer. According to the foregoing, a recording medium having a four-layer structure can be obtained by repeating, three times, the adhesive-bonding step for obtaining the recording medium having the double-layer structure. That is, the recording medium having the four-layer structure can be manufactured by a method similar to that for manufacturing the recording medium having the double-layer structure by basically preparing the same manufacturing apparatuses for the three steps. In the foregoing case, it is preferable that the thicknesses of the first substrates of the pair of optical information recording mediums are substantially the same and the thicknesses of the second substrates of the pair of optical information recording mediums are substantially the same.

According to another aspect of the present invention, there is provided an apparatus for manufacturing an optical information recording medium comprising: a first substrate support section for supporting a first substrate; a second substrate support section disposed to face the first substrate support section so as to support a second substrate; an applying section for applying a resin layer to the upper surface of the first substrate or the second substrate; a spacer disposed on a plane on which the first substrate support section and the second substrate support section face each other, the spacer being disposed outward from the first and second substrates; and a pressing section for elevating the first substrate support section or the second substrate support section and pressing the first and second substrates. The apparatus for manufacturing an optical information recording medium allows, a recording medium having a multilayer structure to be produced efficiently, and it can be expected that the recording capacity can be increased.

It is preferable that the apparatus for manufacturing an optical information recording medium according to the present invention further comprises a light source disposed opposite to a surface of the first substrate support section that is in contact with the first substrate, wherein the first substrate support section is made of a material that permits penetration of a portion of light emitted from the light source. According to the foregoing preferred structure, the photosetting resin layer is used so that the first substrate and the second substrate are adhesive-bonded to each other in a short time.

It is preferable that the apparatus for manufacturing an optical information recording medium according to the present invention has a structure such that each of the first and second substrates has a central opening in the central portion thereof and concentric or spiral projection and pit columns or guide grooves on either surface thereof, and a center position correction section for making the central axes of the information pit columns or guide grooves of the first substrate and the second substrate to coincide with each other is further provided for at least one of the first substrate support section and the second substrate support section. According to the foregoing preferred structure, a recording medium can be obtained in which the deviation of the circular arc of the information pit columns or the guide grooves formed on the surfaces of the two information layers can be inhibited.

It is preferable that the apparatus for manufacturing an optical information recording medium according to the present invention further comprising first and second shaft sections respectively disposed on the central axes of the first and second substrate support sections; and first and second inner-portion guide sections each having a tapered portion having an end larger than the central opening of the substrate and another end smaller than the central opening of the substrate, the first and second inner-portion guide sections being capable of moving along the first and second shaft sections. According to the foregoing preferred structure, the first and second substrates can be secured to the surfaces of the first and second substrate support sections in the state where the tapered portions of the first and second inner-portion guide sections respectively are in contact with the central holes of the first and second substrates. Therefore, the central axis of the first information layer and that of the first substrate support section can be made coincide with each other with a value near the limit of mechanical accuracy. Moreover, the central axis of the second information layer and that of the second substrate support section can be made coincide with each other with a degree near the limit of mechanical accuracy. In the foregoing case, it is preferable that a projecting tapered section is formed on the leading end of one of the first shaft section or the second shaft section, and a corresponding recessed tapered portion is formed in the residual leading end of the other. According to the foregoing preferred structure, by moving the second substrate support section downwards, the projecting tapered portion formed on the leading end of either of the first shaft section or the second shaft section and the recessed tapered portion formed in the leading end of the other are engaged to each other. Thus, the central axis of the first information layer and that of the second information layer can be made to coincide with each other.

According to another aspect of the present invention, there is provided an apparatus for optically recording and reproducing information which irradiates, with light, an optical information recording medium having two different information layers provided with one or more selected from the group consisting of information pits corresponding to information signals, guide grooves for tracking and sample pits so as to be capable of reproducing information signals from the information layers, recording information signals on the information layers and reproducing the recorded information signals. The apparatus for optically recording and reproducing information comprises: optical means for causing an objective lens to converge a light beam emitted from a light source onto the recording medium; focus control means for performing control to make the focal point of the light beam coincide with either of the information layers; tracking control means for controlling the position of the light beam to enable the light beam to follow the information pits, guide grooves or the sample pits; layer identification means for demodulating a signal for identifying the information layers in accordance with light reflected by or transmitted through the information pits; layer selection means for selecting an information layer from which the information signal is reproduced or on which the same is recorded; and switch means for switching a method of tracking, which is performed by the tracking control means, to correspond to a result of selection performed by the layer selection means. According to the foregoing preferred structure of the an apparatus for optically recording and reproducing information, information can be recorded on and reproduced from the recording medium having a multilayer structure.

It is preferable that the apparatus for optically recording and reproducing information according to the present invention further comprises layer comparison means for subjecting, to a comparison a result of selection performed by the layer selection means and a result of identification performed by the layer identification means, and a focus jumping circuit for generating a pulse voltage to move the focal point of the light beam between the information layers to correspond to an output from the comparison means. According to the foregoing preferred structure, if an information layer, which is not the subject, is focused, the focusing position can be moved to the subject information layer. In the foregoing case, it is preferable further to provide tracking polarity inverting means for switching the polarity of the tracking control means in synchronization with the operation of the focus jumping circuit. According to the foregoing preferred structure, even in a case of a recording medium having the first information layer and the second information layer having information pits formed in the opposite directions between the two layers when viewed from a position upon which the light beam is made incident, the light beam can instantaneously be moved onto the information pit of the subject information layer.

It is preferable that the apparatus for optically recording and reproducing information according to the present invention has a structure such that the focus control means includes a first focus control means for performing control to make the focal point of the light beam to coincide with a position near the information layer, second focus control means permitted to be operated in a range smaller than that of the first focus control means, and focus switch means for performing switching to the second focus control means after the operation of the first focus control means has been completed. According to the foregoing preferred structure, servo operation of each information layer can be performed stably while maintaining the focus pulling performance similar to that obtainable from the conventional structure.

It is preferable that the apparatus for optically recording and reproducing information according to the present invention has a structure such that the focus control means has at least two types of operation conditions to be adaptable to each of the information layers, the focus control means being arranged to select one of the operation conditions in accordance with a result of selection performed by the layer selection means. According to the foregoing preferred structure, focus deviation can be corrected so that information can be recorded or reproduced satisfactorily.

It is preferable that the apparatus for optically recording and reproducing information according to the present invention has a structure such that the tracking control means has at least two types of operation conditions to be adaptable to each of the information layers, the tracking control means being arranged to select one of the operation conditions in accordance with a result of selection performed by the layer selection means. According to the foregoing preferred structure, tracking deviation can be corrected so that information can be recorded or reproduced satisfactorily.

It is preferable that the apparatus for optically recording and reproducing information according to the present invention further comprises a photodetector for performing a focus control including a first divisional light receiving surface for receiving a portion of light reflected by the recording medium and a second divisional light receiving surface for receiving the reflected light on the same plane on which the first divisional light receiving surface is positioned, the second divisional light receiving surface receiving the reflected light on the outside of the first divisional light receiving surface. According to the foregoing preferred structure, when information is reproduced from a recording medium having a multilayer structure, the range in which the focus is pulled can be enlarged by switching the focus detection region between the moment when the focus is pulled and the moment when the servo operation is performed.

BRIEF DESCRIPTION OF THE DRAWINGS

FIG. 2 is a perspective view showing the structure of an optical information recording medium having two reproduction only information layers according to the present invention;

FIG. 9 shows the sequence for manufacturing the optical information recording medium having two information layers according to the present invention;

FIG. 10 shows the sequence for manufacturing the optical information recording medium having four information layers according to the present invention;

DESCRIPTION OF THE PREFERRED EMBODIMENTS

An optical information recording medium and an optical information recording and reproducing apparatus according to the present invention will now be described with reference to the drawings.

Figure 1:
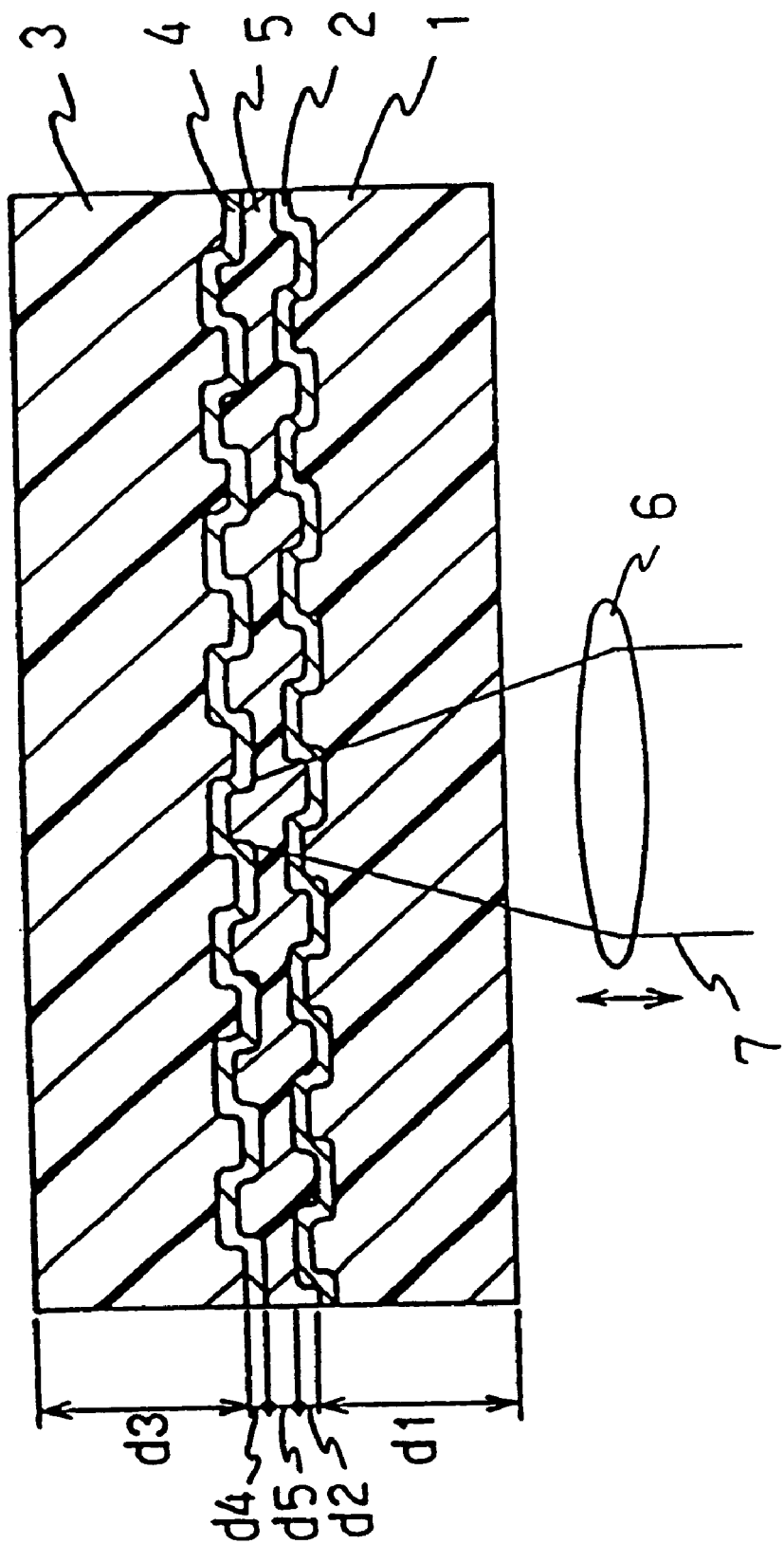
FIG. 1 is a cross sectional view showing the structure of an optical information recording medium having two information layers according to the present invention.

FIG. 1 is a cross sectional view showing an embodiment of the optical information recording medium according to the present invention. As shown in FIG. 1, guide grooves for tracking, sample pits or information pits corresponding to information signals are formed on either surface of a first substrate 1 having thickness d1. On the foregoing surface of the first substrate 1, there is formed a first information layer 2 formed by a thin film which reflects a portion of a light beam 7 made incident on the first substrate 1 and permits penetration of a portion of the light beam 7, the thin film 2 having thickness d2. On a surface of a second substrate 3 having thickness d3, there are formed guide grooves or information pits corresponding to information signals. On the surface of the second substrate 3, there is formed a second information layer 4 formed by a thin film having a reflectance higher than that of the first information layer 2 and having thickness d4. Between the first information layer 2 and the second information layer 4, there is formed a transparent separation layer 5 for positioning the first information layer 2 and the second information layer 4 apart from each other for a predetermined distance d5. Thus, an optical information recording medium having a double-layer structure is constituted.

It is preferable that the first substrate 1 and the second substrate 3 are formed vertically symmetrically with respect to the separation layer 5 as much as possible. That is, it is preferable that the materials and the thicknesses (d1 and d3) are made to be substantially the same and the two substrates are different from each other in only the pattern of the information pits on the surfaces thereof and the structures of the first and second information layers 2 and 4.

If the optical information recording medium is constituted as described above, a vertically symmetric structure with respect to the separation layer 5 can be formed. Therefore, even if a stress or the like is generated in the substrate due to change in the temperature or the like during the manufacturing process, any generated distortion can be compensated. Even if unusual deformation factors act on the two substrates due to change in the environment temperature or humidity, deformation and warp can be inhibited. As a result, a structure durable against change in the environment can be obtained. Therefore, even if the first and second substrates 1 and 3 are made of a resin, deformation of the manufactured recording medium causing an error to take place in reproducing signals can be prevented.

Information signals can be reproduced from the optical information recording medium according to this embodiment in such a manner that the two information layers (the first and second information layers 2 and 4) are irradiated with the light beam 7 from a position on the outside of the first substrate 1, and then change in the quantities of reflected light beams is detected so that the information signals recorded on the first and second information layers 2 and 4 are reproduced. To enable the information signals to be reproduced, the light beam 7 for irradiation must be converged efficiently onto each of the first and second information layers 2 and 4.

Therefore, the first information layer 2 must have a predetermined reflectance to enable the information signals formed on the first information layer 2 to be reproduced as the change in the reflected light. Moreover, to allow the light beam 7 for irradiation and having a predetermined intensity to reach the second information layer 4, the first information layer 2 must have a predetermined transmissivity. Although the second information layer 4 is not required to a specific transmissivity, the second information layer 4 must have the highest possible reflectance to enlarge the change in the quantity of reflected light to provide the information signal. That is, when the information signals of the second information layer 4 are reproduced, the light beam 7 must, penetrate the first information layer 2 two times. Therefore, this embodiment has the structure such that the reflectance of the second information layer 4 is set to be higher than that of the first information layer 2.

As a material of the first and second substrates 1 and 3, it is preferable that a material be employed which does not considerably absorb light in a wavelength region of the light beam 7 for the irradiation and which has great strength. Accordingly, the material of the first and second substrates 1 and 3 is a resin, such as a polycarbonate resin, polymethylmethacrylate (PMMA) resin or the like, or glass.

In the case where the resin is used as the material of the first and second substrates 1 and 3, the substrate can be formed by heating the resin to the molten state and filling it into a mold having information pits or a guiding groove on one side thereof. In the case where glass is used as the material of the first and second substrates 1 and 3, a method is employed in which information in the form of information pits is formed on the surface of a flat glass plate by, for example, etching. As an alternative to this, a method (a Photo-Polymerization method) is employed in which an ultraviolet curing resin is applied to the surface of the flat glass plate, followed by pressing a die having a surface comprising information pits to form information in the form of information pits. However, the methods of forming the first and second substrates 1 and 3 are not limited to the foregoing methods. Any method may be employed as long as the employed method is able to give a predetermined optical characteristic to the substrates. Since the foregoing methods are known methods employed in a process for manufacturing a usual optical disk, such as a compact disk, further description thereof is omitted.

The patterns of convex and concave portions to be formed on the surfaces of the first and second substrates 1 and 3 are different from each other depending upon whether the function of the information layers is an exclusively reproducing type or a recording and reproducing type. In the case where the information layers are arranged to be exclusively reproducing, the convex and concave portions are in the form of information pit columns constituted by a pattern formed on the surfaces of the substrates and modulated in response to the information signals. In the case where the information layers are arranged to be recording and reproducing, the convex and concave portions are in the form of guide grooves consisting of continuous convex and concave portions for performing tracking control of the light beam or wobble pits adaptable to a tracking method, called a "sample servo method".

It is preferable that the first and second substrates 1 and 3 have substantially the same size, and are formed by using the same material in the same process. In particular, if a resin material is employed as the material of the substrates and if the substrates are formed by the injection molding method, the substrates can become deformed, such as warped, after being allowed to stand for a long time depending upon the molding conditions or the like. Moreover, change in the environment temperature or humidity causes the substrates to be considerably deformed. In the case where the substrates are formed by the Photo-Polymerization method, similar deformation takes place, though the degree of the deformation is not critical as is experienced with the injection molding method. While considering the foregoing characteristics, this embodiment has the structure such that the first and second substrates 1 and 3 are formed in a similar process and the two substrates are adhesive-bonded to each other with the separation layer 5. As a result of the employment of the vertically symmetric structure with respect to the separation layer 5, stress and distortion of the substrates can be inhibited. Thus, an optical information recording medium having a satisfactory durability against change in the environment can be obtained.

The thicknesses of the two substrates, with which substantially the same mechanical strengths can be attained, depend upon the temperature of the environment in which the recording medium exists or the material of the substrates. To obtain an allowance of the difference in the thicknesses of the two substrates, an optical information recording medium having the following structure was manufactured: a polycarbonate resin having a thickness of 0.6 mm was employed to form the first substrate 1. Then, an Au film having a thickness of 10 nm was formed on the first substrate 1 so that a first information layer 2 was formed. The thickness of the second substrate 3 made of the polycarbonate resin was changed from 0.3 mm to 1.2 mm, and then an Au film having a thickness of 100 nm was formed so that a second information layer 4 was formed. Moreover, a separation layer 5 was formed by an acrylic-type ultraviolet curing resin layer having an average thickness of 40 $\mu$m. The separation layer 5 was used to adhesive-bond the first information layer 2 and the second information layer 4 to each other. The quantity of deformation of the thus-manufactured optical information recording medium was measured, thus resulting in the following values being obtained. That is, if the thickness of the second substrate 3 is 0.6 mm±30% or smaller, allowing to stand in a room temperature environment, the temperature of which was 30° C. and the relative humidity (RH) of which was 80% for 1000 hours, resulted in a quantity of warp of the recording medium of 0.4 mm or smaller. In this case, a stable servo operation was possible. Even if the optical information, recording medium was allowed to stand in a more severe environment, the temperature of which was 80° C. and the relative humidity of which was 80% for 1000 hours, warp of the recording medium could be inhibited in a case where the thickness of the second substrate 3 is 0.6 mm±20% or smaller.

The information layer is classified into two types exemplified by a reproduction-only type and recording and reproducing type. The recording medium according to this embodiment has two information layers. Therefore, the structure of the recording medium may be, in the sequential order as the first information layer and the second information layer, any of the following four types, that is, (A) {reproduction only}—{reproduction only}, (B) {reproduction only}—{recording and reproducing}, (C) {reproducing and reproducing}—{reproduction only}, and (D) {recording and reproducing}—{recording and reproducing}.

The reproduction only information layer is formed by a thin film formed on the surface of the substrate having the foregoing information pits formed thereon, the thin film having a predetermined reflectance with respect to the light beam. In the foregoing case, a material may be selected from a group consisting of metal, such as Au, Al, Cu or their alloys; an oxide, such as $SiO_2$, SiO, $TiO_2$, MgO or $GeO_2$; a nitride, such as $Si_3N_4$ or BN; a dielectric material of a sulfide, such as ZnS or PbS; their mixtures; and a multilayer structure of the foregoing oxide, nitride and the sulfide. By using the foregoing material, information layers having a predetermined reflectance with respect to the light beam having a specific wavelength can be obtained.

In the case where the first information layer 2 is a reproduction only information layer, the first information layer 2 must have a predetermined transmissivity with which the first information layer 2 reflects the light beam 7 made incident upon from a position on the outside of the first substrate 1 and allows the light beam having a predetermined intensity to reach the second information layer 4. In the case where the same material is used to form the first information layer 2 and the second information layer 4, the foregoing object can be obtained by making the thickness of the first information layer 2 to be thinner than that of the second information layer 4. In the case where a metal is employed to form the information layer, the metal is formed into a thin film having a thickness of 5 nm to 40 nm. To maintain both reflectance and the transmissivity of the first information layer 2 at high levels, it is preferable that absorption of light by the information layer is the lowest possible level. In the foregoing case, the first information layer 2 may be a dielectric material or an organic material capable of realizing a high refractive index and a low coefficient of absorption. Moreover, a layer formed by stacking the dielectric material and the organic material enables an information layer that does not considerably absorb light to be obtained.

In the case where the second information layer 4 is the reproduction only information layer, the transmissivity is not required to be considered. It is preferable that the reflectance be the highest possible reflectance. In the case where the metal is employed to form the second information layer 4, a metal formed into a thin film having a thickness of 40 nm to 200 nm is employed.

The recording and reproducing type information layer comprises a thin film formed on the substrate having the guide grooves or the sample pits formed thereon, the thin film having the optical characteristic which is changed when it absorbs the light beam for the irradiation and the state of the change being identified with the light beam. As the recording layer for use as the information layer, a material to be employed may be selected from the group which consists of a phase-change material, the reflectance of which is changed due to light for the irradiation because the state of the thin film is changed; a magneto-optic material in the form of the thin film, the direction of the magnetization of which is changed and the change of which can be detected as a Kerr effect; an organic material, such as a coloring matter, having the spectral reflection factor which is changed; and a photochromic materials.

The phase-change material, the phase of which is changed between amorphous and crystal, may be selected from a group consisting of a chalcogen material, such as SbTe, InTe, GeTeSn, GeSbTe, SbSe, TeSeSb, SnTeSe, InSe, TeGeSnO, TeGeSnAu or TeGeSnSb type material; and an oxide material, such as Te—TeO$_2$, Te—TeO$_2$—Au or Te—TeO$_2$—Pd type material.

The phase-change material, the phase of which is changed between crystal and crystal, may be a metal compound, such as an AgZn compound or an InSb compound.

As the magneto-optic material, MnBi, TbFe or TbFeCo type material may be employed.

As the organic coloring matter, a leuco dye, such as triphenylmethane or the like may be employed. The photochromic material may be spiropyran, fulgide or azo type material.

Note that the recording-enabled information layer is, in view of its function, classified into a write-once type information layer to which information can be recorded only one time and a rewriting type information layer on which recorded information can be rewritten. In the case of the write-once type information layer, only one layer made of the phase-change material layer or the organic coloring matter layer is required to be, as the information layer, formed on the substrate. Another method may be employed in which a double-layer structure consisting of a light absorbing thin film layer and a metal layer is employed to prepare alloys by irradiation with light.

Although the information layer may be constituted by only a recording layer, it is preferable that a plural-layer-structure including at least two layers be employed in order to cause the material forming the information layer to be reversibly changed and the optical change in the recorded signal to be enhanced. The double-layer structure may be a structure including a dielectric material layer/a recording layer, a structure including a recording layer/a reflecting layer or a structure including a reflecting layer/a recording layer (in the foregoing sequential order when viewed from a position upon which the light beam 7 is made incident). A triple-layer structure may be, when viewed from the substrate, a structure including a dielectric material layer/a recording layer/a dielectric material layer or a structure including a dielectric material layer/a recording layer/a reflecting layer. A quadruple layer structure may be a structure including, when viewed from a position upon which the light beam 7 is made incident, a dielectric material layer/a recording layer/a dielectric material layer/a reflecting layer. A quintuple structure may including a first reflecting layer/a dielectric material layer/a recording layer/a dielectric material layer/a second reflecting layer when viewed from the substrate. By forming the recording layer and the dielectric material layer to be in contact with each other, deterioration in the thin film when recording is performed repeatedly can be prevented. Moreover, optical change in recorded information can be set to a great degree.

The dielectric material layer may be made of a material selected from a group consisting of an oxide, such as SiO$_2$, SiO, TiO$_2$, MgO or GeO$_2$; a nitride, such as Si$_3$N$_4$ or BN; a sulfide, such as ZnS or PbS; and their mixtures.

The reflecting layer may be made of any material exemplified when the reproduction only information layer has been described.

In order to maintain a sufficiently large quantity of light on the second information layer 4, it is preferable that the separation layer 5 be made of a material which does not considerably absorb light having the wavelength region of the light beam 7, in particular, light which has passed through the first information layer 2. Therefore, the separation layer 5 may be made of a transparent adhesive agent, glass similar to that of the substrate or a resin material. In the case where the first and second substrates 1 and 3 are made of the resin material, it is preferable that a similar-type resin material be employed to maintain mechanical reliability after adhesive-bonding. To shorten the time required to complete the adhesive-bonding process, it is preferable that a ultraviolet curing resin be employed.

The distance d5 of the separation layer 5 must be at least longer than the focal depth determined by the numerical aperture (NA) of an objective lens 6 and the wavelength (λ) of the light beam 7 in order to inhibit influence of the crosstalk from another information layer when either information layer is being reproduced. If the intensity of the light convergent point is 80% or greater with respect to the central intensity (100%) when a light beam is coverged in a stigmatic case, the focal depth Δz allows approximation with the following Equation (1):

$$\Delta z = \lambda / \{2(NA))^2\} \quad (1)$$

In an exemplary case where λ=780 nm and the NA=0.55, then Δz=1.3 μm. Therefor, a region within ±1.3 μm is included in the focal depth. In the case where the foregoing optical system is employed, it is preferable that the thickness d5 of the separation layer 5 be set to a value larger than 2.6 μm.

The influences of recording marks included in the light beam passing through the first information layer 2 when the light beam 7 is focused to the second information layer 4, act as crosstalk taking place when the second information layer 4 is reproduced. Therefore, in order to reproduce the signals stably, it is preferable that the thickness d5 of the separation layer 5 be at least longer than the focal depth, more preferably five times the focal depth. A usual optical disk of a reproduction-only type has information pits formed on the optical recording medium at a pitch shorter than the focal depth. If the thickness of the separation layer is made to be five time the focal depth, the number of the information pits on the first information layer 2, which is irradiated with the light beam 7, is 25 or more, which is sufficiently smaller than a usual allowance of −26 dB to prevent the crosstalk.

To maintain the high recording density of information to be formed on the first and second information layers 2 and 4, the first and second information layers 2 and 4 must be formed in a range into which the objective lens 6 is able to converge light beams. That is, the value of d1+d5, which is the result of addition of the thickness d5 of the separation layer 5 to the thickness d1 of the first substrate 1, must be within a tolerance for the thickness of the base which is permitted by the optical system (the objective lens 6).

Therefore, it is preferable that the thickness d5 of the separation layer 5 be larger than the focal depth of the optical system for converging the light beams 7 and smaller than the tolerance for the base permitted by the foregoing optical system. If the foregoing conditions are satisfied, information, which is not considerably affected by the crosstalk from an information layer other than the subject information layer, can be reproduced when the aberration of the light beam 7 is small. Note that the thickness d5 of the separation layer 5 must be set to an optimum value in consideration of the yield when the optical information recording mediums are mass-produced as recording mediums as well as the optical aberration. By forming the first and second substrates 1 and 3, the first and second information layers 2 and 4 and the separation layer 5 by using the foregoing materials, a recording medium can be obtained which allows information signals to be reproduced from the first and second information layers 2 and 4 when the information layers 2 and 4 are irradiated with light from a position on the outside of the first substrate 1.

A structure of a recording medium capable of stably and easily reproducing signals from the two information layers will now be described. To reproduce information signals recorded on the two information layers stably and easily, it is preferable that the levels of signals obtainable from the two information layers be similar to each other also in view of simplifying the structure of the reproducing apparatus. The description will hereinafter be directed to a structure in which the quantities of reflected light obtainable from the flat portions of the two information layers are similar to each other when viewed from a position upon which the light beam 7 is made incident. In order to facilitate the approximation, the description will be directed to the structure in which both of the first and second information layers 2 and 4 are reproduction only information layers. Note that an assumption is made that the influence of diffraction of transmitted light occurring due to the information pits of the first information layer 2 can be ignored.

An assumption is made that the reflectance of the first information layer 2 is R1, the absorption ratio of the same is A1 and the reflectance of the second information layer 4 is R2. In the foregoing case, another assumption is made that the quantities of reflected light from the flat portions of the two information layers are the same when the amplitudes of signals from the two information layers are the same. The foregoing fact is equivalent to a fact that the quantity T of a light beam 7 that has been incident and has penetrated the first information layer 2 and been reflected by the second information layer 4 and then penetrated the first information layer 2 again, and the reflectance R1 of the first information layer 2 are the same. In the foregoing case, the relationships expressed by the following equations hold:

$$R1 \approx T \tag{2}$$

$$R1 \approx (1-A1-R1)^2 \times R2 \tag{3}$$

$$R1 \approx 1 - A1 + (2 \cdot R2)^{-1} - \{[1 - A1 + (2 \cdot R2)^{-1}]^2 - (1 - A1)^2\}^{0.5} \tag{4}$$

R1 is made to be a maximum value when R2=1 and A1=0. In this case, R1 is 0.382. If R2=0.9 and A1=0.1 in a practical view point, then R1=0.311.

The foregoing phenomenon means that, if the diffraction of light transmitted through the first information layer 2 is ignored and the degrees of diffraction of light reflected by the first and second information layers 2 and 4 are the same, the forming of a second information layer 4 having a reflectance R2 of 90% and a first information layer 2 having a reflectance R1 of 31% and an absorption coefficient A1 of 10% results in the amplitudes of signals to be made the same when information signals are reproduced from the information pits of the first and second information layers 2 and 4.

Referring to Equation (2), a practical structure of the two information layers will now be described. An assumption is made here that the range in which the reproduction amplitudes from the two information layers can be considered to be equivalent is ±20%. The foregoing fact means that the difference between the right side and the left side of Equation (2) is ±20% or smaller.

Thus, substitution of Equation (3) with the foregoing relationship results in the relationship expressed by the following Equation (5) being holding in a case where the reproduction amplitude from the first information layer 2 is smaller by 20% than that from the second information layer 4. On the other hand, in a case where the reproduction amplitude from the first information layer 2 is larger by 20% than that from the second information layer 4, the following Equation (6) hold:

$$R1 = 1.2 \times (1-A1-R1)^2 \times R^2 \tag{5}$$

$$R1 = 0.8 \times (1-A1-R1)^2 \times R^2 \tag{6}$$

While considering the practical characteristic of each layer in the case where the information layers are made of metal or the dielectric material, it is preferable that the reflectance R2 of the second information layer 4 be within a range from 70% to 90%. Moreover, it is preferable that the refractive index A1 of the first information layer 2 be within a range not greater than 20%. Substituting portions of Equations (5) and (6) with the foregoing relationships, the range of the reflectance R1 of the first information layer 2 is 21% to 42%. To maintain the great reproduction amplitudes from both of the first and second information layers 2 and 4, it is preferable that the absorption coefficient A1 of the first information layer 2 be small. If the value of the absorption coefficient A1 is 10% or smaller, the range of the reflectance R1 of the first information layer 2 is 25% to 40%.

As described above, in the case where both of the first and second information layers 2 and 4 are reproduction only information layers, it is preferable that the reflectance R1 of the first information layer 2 be within a range of 25% to 40% to make the reproduction amplitudes from the first and second information layers 2 and 4 to be similar to each other and to maintain the large reproduction amplitude.

In the case where the second information layer 4 is a recording and reproducing information layer, the reflectance of the information layer is smaller than that of the reproduction only information layer. In a case where the reflectance of the second information layer 4 is 30%, use of the first information layer 2 having a reflectance of 19.5% and a coefficient of absorption of 0% makes the quantities of light reflected toward the objective lens 6 to be the same when both of the information layers are irradiated with light. Although the structure of the recording and reproducing apparatus will be described later, the amplitude of the reproduced signal and the quantity of reflected light have predetermined allowances in consideration of the difference between recording mediums and contamination of the surfaces of the recording mediums. Therefore, if the accuracy of the reproducing circuit and the stability of the apparatus are considered, it is preferable that the difference between the amplitudes of the two reproducing signals be smaller than 5 times.

The present invention is characterized in that the substrates having convex and concave portions formed previously are adhesive-bonded to each other so that a recording medium having two information layers is obtained. Therefore, the information pits pattern to be formed on the surface of the first substrate 1 must have signal shapes that can be reproduced through the base of the first substrate 1. Moreover, the information pits pattern to be formed on the surface of the second substrate 3 must have signal shapes that can be reproduced when irradiated with light through the surfaces of the information pits. Accordingly, the information pits pattern of the first and second substrates 1 and 3 are formed to run in the same direction when viewed from a position upon which the light beam 7 is made incident. In the case where the information layers are the reproduction only information layers, the direction of the information pits pattern is made to be in the direction in which the information pits are formed to correspond to the information signals.

In the case where the information layers are the information recording and reproducing layers, the foregoing structure is applied to address information for administering the guide grooves.

The structure of the recording medium will now be described in detail in which the first and second information layers 2 and 4 are a reproduction only information layer and a reproduction only information layer categorized as (A).

In view of reducing the manufacturing cost of the substrates, it is preferable that the first and second substrates 1 and 3 be manufactured by the same process as much as possible. The information pits are formed on the surfaces of the substrates by a method including of a mastering step for manufacturing a master and an injection molding step in which a resin material is injected into the master placed in a mold to form a substrate having information pits. Since the mastering method is a known method which is usually employed when compact disks or CD-ROMs are manufactured, the detailed description of this method is omitted here. Briefly, a photoresist is applied to a flat glass plate, following by irradiating the surface of the photoresist with Ar laser beams modulated in response to the information signals, followed by removing the photoresist, and followed by plating the surface from which the photoresist has been removed so that a master is manufactured.

If the same mastering process is employed, the shapes of the information pits to be formed on the substrates, that is, the relationships of the information pits whether they are formed in the form of convex and concave portions with respect to a plane, are made to be the same. FIG. 2(a) shows an example of an optical information recording medium manufactured by adhesive-bonding the substrates formed by the same process. As shown in FIG. 2(a), information pits 11 of the first substrate 1 have convex shapes when viewed from the position upon which the light beam 7 is made incident. Information pits 12 of the second substrate 3 have concave shapes when viewed from the position upon which the light beam 7 is made incident. In the case where the characteristics of the photoresists are different from each other, information pits of the first substrate 1 have concave shapes when viewed from the position upon which the light beam 7 is made incident. Information pits of the second substrate 3 have convex shapes when viewed from the position upon which the light beam 7 is made incident. In any case, the directions of the information pits formed in the two information layers 2 and 4 are opposite to each other when viewed from the position upon which the light beam 7 is made incident.

As a result of the foregoing structure, the same material and molding process can be employed as well as the mastering process. Therefore, two types of manufacturing apparatuses having the same function are required to be prepared when the optical information recording medium is manufactured or one manufacturing apparatus is required to be used commonly. Therefore, the cost of the manufacturing facilities can be reduced.

Since the recording medium having the foregoing structure compris the pits formed in the opposite directions between the two information layers 2 and 4 when viewed from a position upon which the light beam 7 is made incident, the tracking polarity must be switched between the information layers 2 and 4 when a tracking method, such as a push-pull method, is used to record or reproduce information. To prevent this, the direction of the pits of the second information layer 4 is required to be reversed to have convex shapes when viewed from the position upon which the light beam 7 is made incident. By manufacturing the second information layer 4 with a master having the photoresist with the reversed characteristic in the mastering process or by using a second master obtainable by again transferring a master obtained by the conventional method, pits formed in the opposite directions can be obtained between the two information layers 2 and 4.

The sizes of the information pits of the first and second substrates 1 and 3 will now be described. The size of the pits to be formed on the second substrate 3 is classified into two types depending upon whether the distance from the surface of the first substrate 1 upon which the light beam 7 is made incident to the surfaces of the first and second information layers 2 and 4 is within tolerance $\Delta Wd$ of the thickness of the base permitted by the optical system for converging the light beam 7. Note that the tolerance $\Delta Wd$ of the thickness of the base is determined by the spherical aberration of the light beam 7, the tolerance $\Delta Wd$ of the thickness of the base being generally in inverse proportion to the fourth power of the numerical aperture (NA) of the objective lens 6 (see FIG. 1). For example, in an optical system having a wavelength $\lambda$ of 780 nm and a numerical aperture NA of 0.5, the tolerance $\Delta Wd$ of the thickness of the base is about 50 $\mu$m. Note that the tolerance $\Delta Wd$ of the thickness of the base depends upon the density of the pits, that is, the intervals between the pits. If the intervals between the pits are long, signals can be reproduced even if a spherical aberration takes place. Thus, the tolerance range is enlarged.

A structure is shown in FIG. 2(a) which is employed in the case where both of the distances from the surface of the first substrate 1 upon which the light beam 7 is made incident to the surfaces of the first and second information layers 2 and 4 are within the tolerance $\Delta Wd$ of the thickness of the base determined by the light converging optical system and the pit density. A main issue in the foregoing case lies in that the information pits 11 on the first information layer 2 and second information layer 4 are different from each other. The reason for this is that the first information layer 2 has a main reflecting surface which is in contact with the first substrate 1, while the second information layer 4 has a main reflecting surface which is the interface between the second information layer 4 and the separation layer 5.

In a case where the width of each of the information pits 11 on the first substrate 1 is W11 and the width of each of the information pits 12 on the second substrate 3 is W12, the width of the main reflecting surface is such that the width is the pit width W11 for the first information layer 2 and the same is the pit width W13 for the second information layer 4, the pit width W13 being the width of the pit of the interface between the second information layer 4 and the separation layer 5. In a case where a known sputtering method is employed to form the information layers on the substrates, the thin film will be formed to reach the diagonal surfaces of the information pits as well as in a direction perpendicular to the surface of the substrate though the degree depends upon the manufacturing method. Therefore, the pit width W13 on the interface with respect to the separation layer 5 is smaller than pit width W12 of the information pits 12 on the second substrate 3. To make the degrees of diffraction of light reflected by the information pits to be the same, the pit width W12 of the information pits 12 on the second substrate 3 must be larger than the pit width W11 of the information pits 11 on the first substrate 1.

The pit width W12 of the information pits 12 on the second substrate 3 is corrected in accordance with a result of a process of actually forming the second information layer 4. The inventors have performed an experiment in which Au was used to form the second information layer 4. On information pits each having a pit width W12 of 0.50 μm and a depth of 90 nm on the second substrate 3, there was formed an Au layer (the second information layer 4) having a reflectance of 90% or higher and a thickness of 150 nm so that the shape of the second information layer 4, which corresponds to the interface with respect to the separation layer 5, was measured. As a result, the pit width W13 was 0.3 μm and the depth was 90 nm. In a case where the second information layer 4 is formed under the foregoing conditions, the shapes of the information pit to be formed on the surface of the second substrate 3 is determined such that the pit width W12 is 0.70 μm in consideration of the change in the shape of the pit due to existence of the second information layer 4. In the foregoing case, information pits each having a pit width W11 of 0.50 μm and a depth of 90 nm are formed on the first substrate 1. As described above, the information pits 12 on the second substrate 3 are formed to have a size larger than that of the information pits on the first substrate 1 in consideration of a reduction in the substantial width of the information pit due to the thickness of the second information layer 4. Note that track pitches Tp1 and the pit densities of the information pits to be formed on the surfaces of the first and second substrates 1 and 3 are the same.

In the mastering process for forming the second substrate 3, the size of the information pit is enlarged as compared with that on the first substrate 1 by setting the power of a light source for exposing the photoresist to light to be a slightly larger value. The other processes for forming the first and second substrates 1 and 3 are the same.

Although the case has been described in which the pit widths were made to be different from each other between the first and second substrates 1 and 3, the conditions for forming the information layers sometimes result in a consideration being made such that the angle of inclination of the diagonal surface of the pits on the substrates is different from the angle of inclination of the diagonal surfaces of the formed information layers. In the foregoing case, the depth of the pit on the first substrate 1 and that on the second substrate 3 are made to be different from each other, or both of the pit width and the pit depth are made to be different between the same. As a result of the foregoing structure, the degrees of diffraction of reflected light with respect to the incidental light beam 7 taking place between the first and second information layers 2 and 4 can be made to approach each other. Thus, stable signal reproduction can be performed.

FIG. 2(b) shows a structure to be employed in a case where either of the two information layers is out of the tolerance of the thickness of the base permitted by the light converging optical system. A main issue in the foregoing case lies in that convergence of the light beam 7 to an information layer which is out of the tolerance ΔWd of the thickness of the base results in a spherical aberration being generated and thus sufficient convergence of light spots being inhibited. The phenomenon in which either of the two information layers is out of the tolerance ΔWd of the thickness of the base of the light convergence optical system takes place due to reduction in the tolerance ΔWd of the thickness of the base occurring when the wavelength of the light beam 7 has been shortened and the numerical aperture (NA) of the objective lens has been enlarged for the purpose of raising the density of information on the information layer. The foregoing phenomenon occurs in a case where a thin separation layer cannot easily be obtained when the separation layer 5 is formed or in a case where the accuracy of the thickness of the separation layer 5 is unsatisfactory.

In the foregoing case, the density of pits on the surface of the substrate having the information layer which is out of the tolerance ΔWd of the thickness of the base is required to be lower than the density of the pits on the substrate having the information layer which is within the tolerance ΔWd of the thickness of the base. FIG. 2(b) shows an example of a structure to be employed in the case where the first information layer 2 is within the tolerance ΔWd of the thickness of the base and the second information layer 4 is out of the tolerance ΔWd of the thickness of the base. Each of information pits on the first substrate 1 has a predetermined pit width W11, a track pitch of Tp1 and a pit density of Pd1. Each of information pits 14 on the second substrate 3 has a predetermined pit width W14, a track pitch of Tp3 and a pit density of Pd3. While considering deterioration in the diaphragm due to the spherical aberration of the light beam 7 on the second information layer 4, the pit width W14 and the track pitch Tp3 of the information pits 14 on the second substrate 3 are made to be larger than those of the first substrate 1.

As a result of the foregoing structure, even if the second information layer 4 is out of the tolerance ΔWd of the thickness of the base of the optical system for converging the light beam 7, a change in the quantity of reflected light similar to that obtainable from the first information layer 2 can be obtained from the pit portions. Thus, stable signal reproduction can be performed.

Then, a pattern of the information pits or that of the guide grooves on the surfaces of the substrates in the direction of the track will now be described. Although the information pits to be formed on the first and second substrates 1 and 3 may be formed into concentric circles, it is preferable that a spiral form be employed similar to that of the conventional optical disk in view of capability that the accuracy of the track pitch and the like can be improved as compared with the structure having the concentric circles when the mastering process is performed. The structure having the spiral projection and pit column is classified into two types to meet the purpose.

A first structure is arranged such that the projection and pit columns on the first and second substrates 1 and 3 run in the same direction when viewed from the light incidental portion. In the foregoing case, the light beam is moved in one direction from the inside to the outside or one direction from the outside to the inside regardless of the information layer having the information pits which are subjected to tracking. In a case where a structure is employed in which the light beam is moved from the inside to the outside, a reproduction method may be employed in which administration information is detected in the internal portion of either of the information layers and an access is made to a desired information region including the portion between the information layers. Therefore, the foregoing structure is suitable to a recording medium in which high speed access must be permitted.

As a method of obtaining the second substrate 3 with which the foregoing structure can be realized, the foregoing method may be employed in which the second master to which the master has been transferred again is used to reverse the directions of the information pits. That is, transference of the surface of the master manufactured by the photoresist to the second master enables columns of information pits formed in the opposite directions and in the opposite spiral directions to be obtained. By adhesive-bonding the second substrate 3 and the first substrate 1 through the separation layer 5, a recording medium having the same spiral direction when viewed from a light incidental position can be obtained.

In a case where the process for manufacturing the second master is omitted, the recording direction employed in the mastering process is changed so that the first and second information layers 2 and 4 having the same spiral direction when viewed from the light incidental position are obtained. That is, when the photoresist is exposed to light, the direction in which the flat glass plate is made to be opposite to that employed when the master of the first substrate 1 is manufactured so that the first and second information layers 2 and 4 having the same spiral direction when viewed from the light incidental position are obtained. Note that the information pits when viewed from the light incidental position are made to be opposite to each other between the first and second information layers 2 and 4.

A second structure is arranged such that the projection and pit columns on the first and second substrates 1 and 3 run in opposite directions when viewed from the light incidental position. In the foregoing case, the direction in which the light beam is moved (in a direction from the inside to the outside or a direction from the outside to the inside) is made to be opposite in accordance with the information layer having the information pits which have been subjected to tracking.

The foregoing structure is effective in a case where information continued for a long time is treated. An example of a structure will now be described in which the light beam is moved from the inside portion to the outside portion of the information pits on the first information layer 2 and the light beam is moved from the outside portion to the inside portion of the information pits on the second information layer 4. After the light beam has reproduced final information in the outer portion of the first information layer 2, the light beam is moved to the outer portion of the second information layer 4 (that is, an optical pickup makes an access to the information start point of the second information layer 4 while keeping the same position). The light beam continuously starts reproduction of information at the outer portion of the second information layer 4. Since the foregoing information reproducing method does not involve the optical pickup being moved when the light beam is moved from a layer to another layer, time loss can effectively be prevented during the movement of the light beam. In a case where the recording pits are in a CLV mode (a constant line velocity mode), the position of the optical pickup is not changed and, therefore, the change in the rotational speed can effectively be prevented.

As a method of mastering the second substrate 3 which is able to realize the foregoing surface, a method may be available in which the position at which recording of the signals starts is made to be opposite to that employed in the exposing process when the master of the first substrate 1 is manufactured. In a case where recording of information of the first substrate 1 starts at an inner position, a master exposed to light from the outer portion is used. Since the recording medium manufactured by using the thus-obtained first and second substrates 1 and 3 comprises information pits on the first and second substrates 1 and 3 which are formed in the opposite directions when viewed from the light incidental position, the tracking polarity must be switched between the information layers.

As another method of mastering the second substrate 3, a method may be employed in which exposure of the outer portion is performed similar to the foregoing case in a state where the direction in which the flat glass plate is made to be opposite to that employed when the master of the first substrate 1 is manufactured. Since the recording medium manufactured by using the thus-obtained first and second substrates 1 and 3 has the information pits on the first and second substrates 1 and 3 which are formed in the same direction when viewed from the light incidental position, the necessity of switching the tracking polarity between the information layers can be eliminated.

The foregoing structures having both reproduction only information layer and a recording and reproducing information layer will now be described, which are a reproduction only-recording and reproducing type structure (B) and a recording and reproducing-reproduction only structure (C).

When the foregoing structures (B) and (C) are subjected to a comparison, the foregoing structure (B) is advantageous in which the first information layer is made to be the reproduction only information layer and the second information layer is made to be the reproducing and recording information layer because the light absorption into the first information layer can be reduced. In the case of the foregoing structure (C) in which the first information layer is the recording and reproducing type information layer, light absorption is required to record information on the information layer. In the foregoing case, diffraction of transmitted light due to the recording mark is generated when signals are recorded on the first information layer 2. Thus, the quantity of light which is able to reach the second information layer 4 is reduced.

Figure 3:
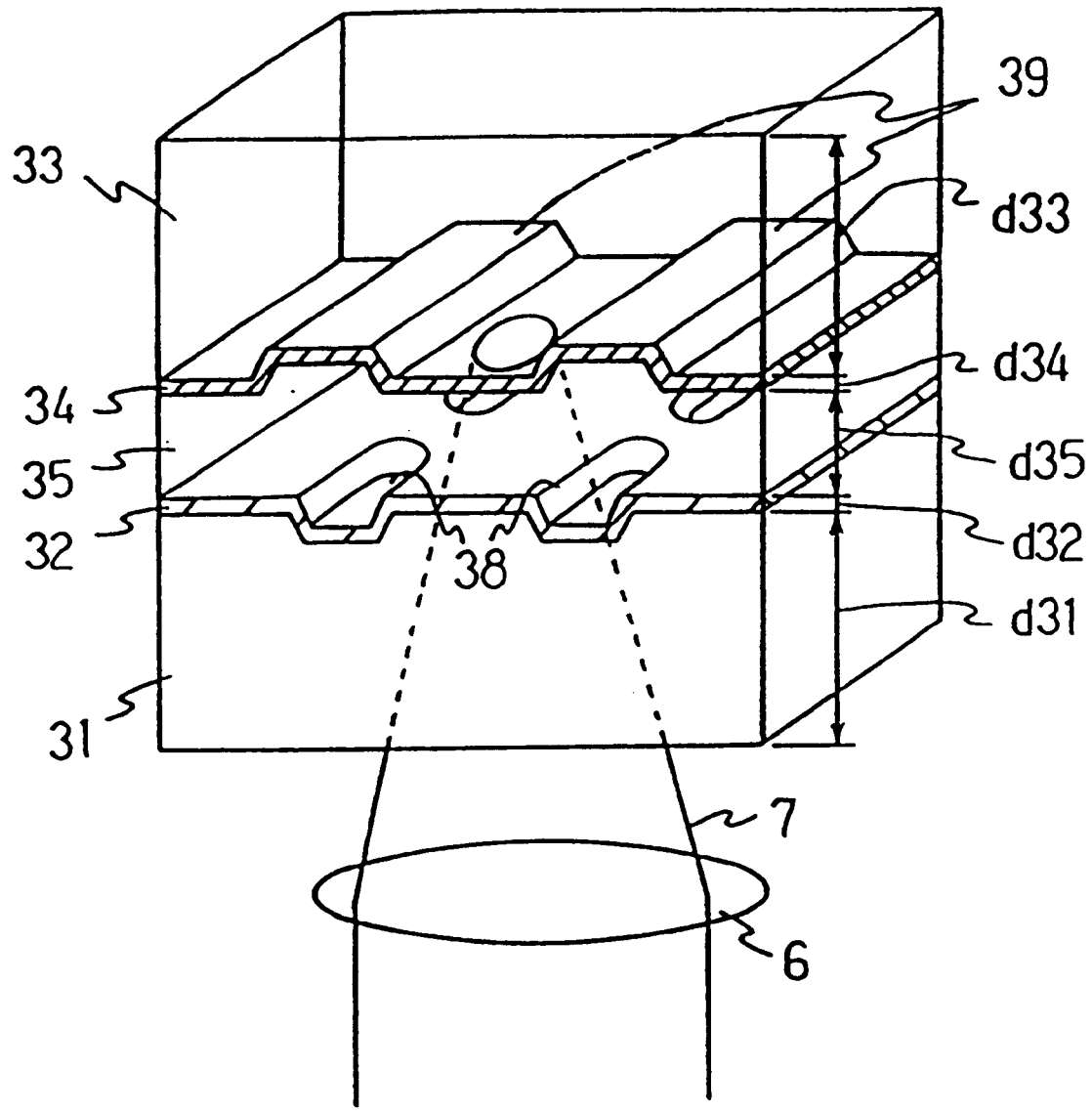
FIG. 3 is a perspective view showing the structure of an optical information recording medium having a reproduction only information layer and a recording and reproducing information layer according to the present invention.

FIG. 3 is a cross sectional view showing an example of a structure of the optical information recording medium having the foregoing structure (B) of the reproduction only-recording and reproducing type information layers. As shown in FIG. 3, information pits 38 corresponding to information signals are formed on one surface of a first substrate 31 having a thickness of d31. Moreover, on one surface of the first substrate 31, there is formed a first information layer 32 having a predetermined transmissivity, a predetermined reflectance and a thickness of d32. On one surface of a second substrate 33 having a thickness of d33, there are formed tracking guide grooves 39 or sample pits. On one surface of the second substrate 33, there is formed a second information layer 34 formed by a thin film, the optical characteristic of which is changed when irradiated with the light beam 7 and which has a thickness of d34. Between the first information layer 32 and the second information layer 34, there is formed a transparent separation layer 35 for positioning the first information layer 32 and the second information layer 34 to be apart from each other for a predetermined distance d35.

The first information layer 32 has a predetermined transmissivity with respect to the light beam 7 in order to allow light having a predetermined intensity to reach the second information layer 34. The temperature of a portion of the second information layer 34 that has been irradiated with the light beam 7, the intensity of which has been intensified, is raised. As a result, the optical characteristic of the second information layer 34 is changed so that information is recorded on the second information layer 34. Thus, the second information layer 34 has a structure capable of satisfying both high coefficient of absorption with respect to the light beam 7 and great optical change, that is, a high efficiency in reproducing recorded signals.

Since the first information layer 32 is a reproduction only information layer, the first substrate 31 has, on the surface thereof, information pits 38 corresponding to information signals. Since the second information layer 34 is a recording and reproducing type information layer, the second substrate 33 has, on the surface thereof, guide grooves comprising convex and concave portions for controlling tracking for locating the light beam when information is recorded or sample pits (not shown) consisting of a pair of a projection and a pit which are shifted in the tracking direction to correspond to the sample-servo type tracking operation. In a case where the foregoing substrates are in the form of a disk, it is preferable that the information pits, the guide grooves or the sample pits be formed into a spiral that is formed in the same direction when viewed from a position upon which the light beam 7 is made incident.

Figure 4:
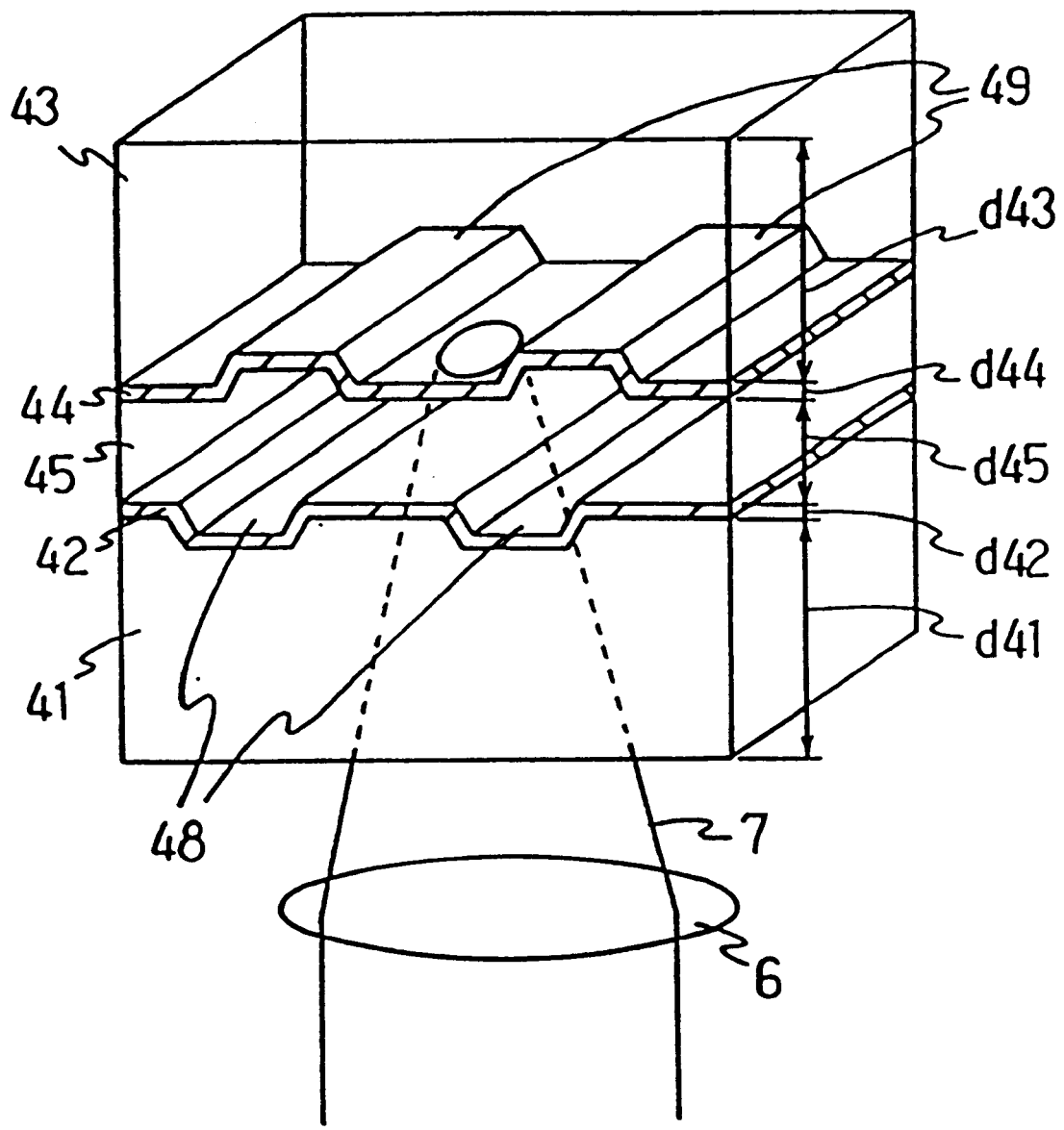
FIG. 4 is a perspective view showing the structure of an optical information recording medium having two recording and reproducing information layers according to the present invention.

A recording medium having the information layers of the foregoing structure (D) consisting of the recording and reproducing information layer and the recording and reproducing information layer will now be described with reference to FIG. 4. As shown in FIG. 4, a first substrate 41 having a thickness of d41 has one surface on which tracking guide grooves 48 or sample pits are formed. The first substrate 41 has one surface having a first information layer 42 which has a predetermined transmissivity and a predetermined reflectance, the optical characteristic of which changes when irradiated with the light beam 7, and which has a thickness of d42. On one surface of the second substrate 43 having a thickness of d43, there are formed tracking guide grooves 49 or sample pits. On one surface of the second substrate 43, there is formed a second information layer 44 formed by a thin film, the optical characteristic of which is changed when irradiated with the light beam 7 and which has a thickness of d44. Between the first information layer 42 and the second information layer 44, there is formed a transparent separation layer 45 for positioning the first information layer 42 and the second information layer 44 apart from each other for a predetermined distance d45.

Also in the foregoing case, it is effective when the foregoing structure on the surface of the substrate is adopted to information pits for the reproduction only information layer. In particular, the address pit to be formed on the surface of the substrate together with the guide grooves or the sample pits so as to administer the recording medium is able to employ all of the methods adapted to the foregoing information pits for only reproducing information.

The information layers for recording and reproducing information is able to employ the information layers employed in the case of the foregoing structure (B) consisting of the reproduction only information layer and the recording and reproducing type information layer. In the foregoing case, the first information layer 42 must have characteristics such that it absorbs the light beam 7 in a predetermined quantity, its state is changed because its temperature is raised, the changed state can be detected as change in the reflected light, and it permits light to pass through in a predetermined quantity in order to enable the second information layer 44 to record and reproduce information. Moreover, the first information layer 42 must maintain the characteristic that light penetration is permitted even after information has been recorded. As described above, the first information layer 42 must be designed so as to be formed into a thin film with which high quality signals can be obtained and a required transmissivity realized before and after information has been recorded can be obtained.

The thin film forming the first information layer 42 has, like the phase-change material, an optical constant that is changed, the changed state being detected as change in the reflectance. In a case where the second information layer 44 is irradiated with the light beam in the state where information has been recorded on the first information layer 42, a portion of light, which has passed through the first information layer 42, is diffracted. Residual beams are converged onto the second information layer 44. Therefore, the intensity of the light beam 7 must be set to a high level as compared with that to be applied to the reproduction only information layer.

In view of satisfactorily reproducing signals, the thickness d45 of the separation layer 45 must be larger than the focal depth, and preferably at least, 5 times the focal depth. Thus, the number of recording marks included in the light beam when the first information layer 42 is penetrated by the light beam is made to be 25 or more which is the square of 5. As a result, an influence of crosstalk or the like can be inhibited.

In the case where the first information layer 42 is formed into a magneto-optic recording type thin film, the direction of magnetization of which is changed, transmitted light does not diffract. Since the necessity of considering the change in the transmitted light before and after information has been recorded can be eliminated, an advantage can be realized. However, the first information layer 42 must absorb light in a predetermined quantity in order to record information. Therefore, it is preferable that the quantity of light to be applied be set to be larger than that set in the case of the reproduction only information layer.

The optical recording medium has a characteristic that a reproduction only medium and a recording and reproducing medium are able to coexist with each other. Moreover, a so-called partial ROM disk can be manufactured in which the same medium surface has a reproduction only region formed in the inner portion thereof and a recording and reproducing region formed in the outer portion thereof.

A recording medium having four information layers will now be described, which is an improvement of the recording medium having the two substrates having convex and concave portions on the surface thereof and adhesive-bonded to each other. This recording medium is described with reference to FIG. 5.

Figure 5:
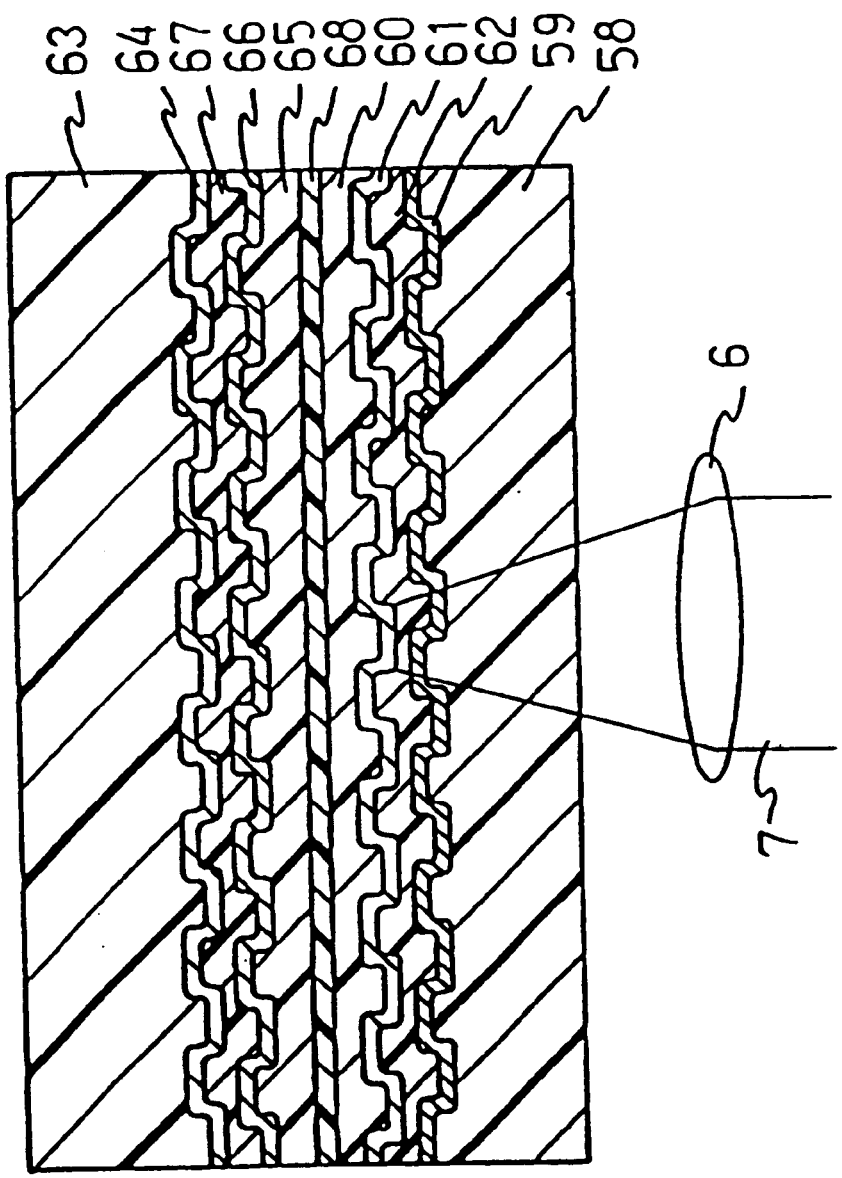
FIG. 5 is a cross sectional view showing the structure of an optical information recording medium having four information layers according to the present invention.

As shown in FIG. 5, information pits corresponding to information signals or guide grooves for controlling tracking of the light beam or sample pits are formed on one surface of a first substrate 58. Moreover, a first information layer 59 for transmitting a portion of the light beam 7 made incident upon the first substrate 58 and having a predetermined reflectance is formed on one surface of the first substrate 58. On one surface of the second substrate 60, there are formed information pits corresponding to information signals or guide grooves for controlling tracking of the light beam or sample pits. On one surface of the second substrate 60, a second information layer 61 is formed which has a reflectance higher than that of the first information layer 59. The first information layer 59 and the second information layer 61 are positioned opposite to each other. Between the first information layer 59 and the second information layer 61, there is formed at least a first separation layer 62. A third substrate 63 having a similar thickness to that of the first substrate 58 has a surface on which information pits corresponding to information signals or guide grooves for controlling tracking of the light beam or sample pits are formed. On one surface of the third substrate 63, there is formed a third information layer 64 which transmits a portion of the light beam made incident on the third substrate 63 and which has a predetermined reflectance. A fourth substrate 65 having substantially the same thickness as that of the second substrate 60 has a surface on which information pits corresponding to information signals or guide grooves for controlling tracking of the light beam or sample pits are formed. Moreover, on one surface of the fourth substrate 65, there is formed a fourth information layer 66 having a reflectance higher than that of the third information layer 64. The third information layer 64 and the fourth information layer 66 are formed opposite to each other. Between the third information layer 64 and the fourth information layer 66, there is formed a transparent second separation layer 67 in the form of at least one layer, the second separation layer 67 having a thickness similar to that of the first separation layer 62. The second substrate 60 and the fourth substrate 65 are formed opposite to each other. Between the second substrate 60 and the fourth substrate 65 there is formed an adhesive layer 68.

Since the recording medium having the foregoing structure has a vertically symmetric structure with respect to the adhesive layer 68, it can be said that the foregoing structure is stable even if change, such as change in the environment temperature, occurs.

A method and apparatus for manufacturing the recording a medium having plural information layers will now be described.

If the interval between two information layer is too short in the case where each of the two information layers is reproduced, reflected light from another information layer or light which has transmitted through the same generates crosstalk so that an influence of change in the amplitude of the reproduced signal or that of distortion of the servo signal occurs. If the interval between the two information layers is too long, a aberration is generated in the light converged spot in either of the information layers. To inhibit the foregoing influences, the interval between the two information layers must be made to be constant. In order to achieve this, a separation layer exhibiting excellent accuracy in the thickness thereof is required. Moreover, the two substrates must be adhesive-bonded to each other in such a manner that the central positions of the information pits or sample pits or the guide grooves coincide with each other. Note that the foregoing description is applied only to the case where the recording medium is in the form of a disc shape and information is recorded when the recording medium is rotated. In a case of a recording medium having the two information layers, the tracking control must be performed while considering the allowable eccentricity in the case of a recording medium having one information layer and a second eccentricity occurring due to deviation in the central positions between the two information layers. The present invention is intended to prevent the second eccentricity so as to compensate the tracking servo performed by the recording medium of the foregoing type.

In view of the foregoing, a method of manufacturing the two substrates will now be described. Note that the first substrate is formed by the conventional method. That is, the first substrate is obtained by the steps of manufacturing a master in the mastering process and performing injection molding in a mold. The second substrate may be manufactured by the same process as that for manufacturing the first substrate or a method in which a second master is formed by again duplicating the master in order to reverse the information pits. The injection molding process may be performed by a process similar to that employed to manufacture the first substrate. Note that the injection molding machine for use in this embodiment has the master comprising the spiral or concentric information pits and guide grooves, the center of which accurately coincide with the center of a central opening forming machine for forming the central openings of the first and second substrates. By using the injection molding machine of the foregoing type, first and second substrates can be obtained in which center of the central opening and that of the information pits or the guide grooves do not deviate considerably.

Figure 6:
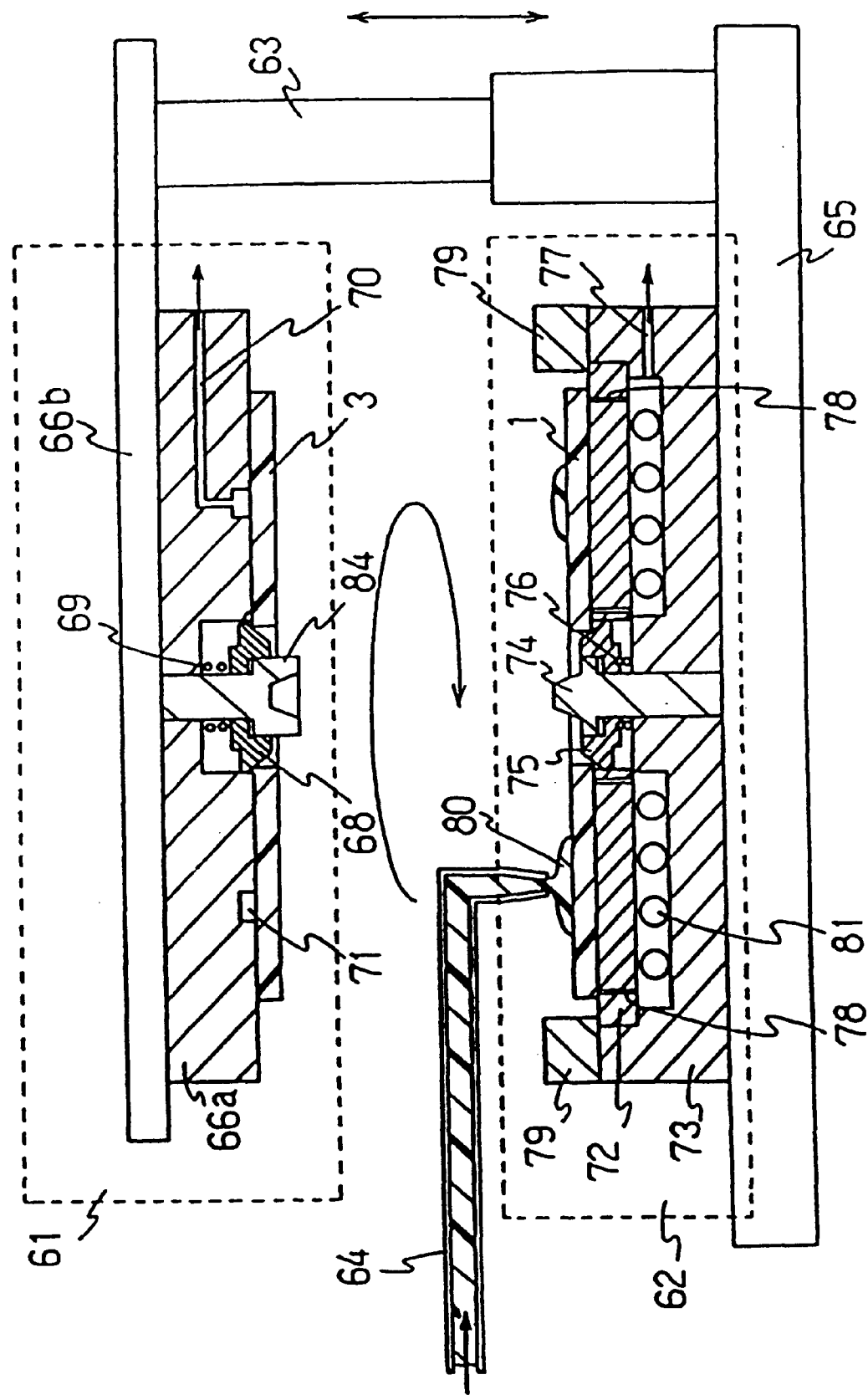
FIG. 6 is a schematic cross sectional view showing an apparatus for manufacturing the optical information recording medium according to the present invention.

An adhesive-bonding apparatus for adhesive-bonding the first and second substrates with a separation layer having a predetermined thickness will now be described. FIG. 6 is a schematic cross sectional view of the adhesive-bonding apparatus. As shown in FIG. 6, the adhesive-bonding apparatus comprises an upper-portion support section 61 for supporting the second substrate 3; a lower-portion support section 62 including a light source 81 for supporting the first substrate 1 and hardening the separation layer; an elevation section 63 for elevating the upper-portion support section 61; a resin-applying nozzle 64 for applying a resin material 80 for forming the separation layer to the first substrate 1; and a base 65 for supporting the overall system.

The upper-portion support section 61 comprises a substrate support section 66a which is in contact with the flat surface of the second substrate 3 to secure the second substrate 3; an upper base section 66b for establishing the connection between the substrate support section 66a and the elevation section 63; an upper shaft 84 downwards projecting over the central portion of the substrate support section 66a and having a tapered recess at a leading end thereof to correct the positional relationship of the lower-portion support section 62; and a first inner-portion guide section 68 having a tapered portion for adjusting the position of the second substrate 3. Around the upper shaft 84, a spring 69 for downwards pressing the first inner-portion guide section 68 with predetermined force is disposed. On a region of the substrate support section 66a which is in contact with the second substrate 3, there is formed a suction opening 71 for securing the second substrate 3 by vacuum action, with air being discharged to an external pump through an evacuation port 70 formed in the substrate support section 66a.

On the other hand, the lower-portion support section 62 comprises a base support section 72 for supporting the first substrate 1; a light-source box 73 for securing the base support section 72 to the base 65 and accommodating a light source 81; a lower shaft section 74 having a tapered projection at the leading end thereof to face the recess of the upper shaft 84; and a second inner-portion guide section 75 for adjusting the position of the first substrate 1 by the tapered portion thereof. Around the lower shaft section 74, there is disposed a spring 46 for upwardly pressing the second inner-portion guide section 75 with predetermined force.

The light source 81 hardens a resin material 80 for forming the separation layer and is disposed in the bottom portion of the light-source box 73 and immediately below the base support section 72. Therefore, the base support section 72 is made of a material which permits light emitted by the light source 81 to pass through, for example, glass or a resin. Moreover, a portion of the base support section 72, which is in contact with the first substrate 1, has an adsorption opening 78 for securing the first substrate 1 by vacuum adsorption so that air is discharged to an external pump through an evacuation opening 77 formed in the light-source box 73. In a portion of the light-source box 73 outward from the first substrate 1 and opposite to the substrate support section 66a, there is disposed a spacer 79 for maintaining the thickness d5 of the separation layer.

The resin-applying nozzle 64 extrudes resin material 80 supplied from an external resin reservoir tank through its leading end thereof so as to apply the resin material 80 to the upper surface of the first substrate 1. The leading end of the resin-applying nozzle 64 is arranged to move on a circle, the radius of which is about ⅔ of the radius of the first substrate 1 relative to the central axis of the first substrate 1. Note that the resin-applying nozzle 64 is removed from the region on the lower-portion support section 62 if it does not apply the resin material 80 to the upper surface of the first substrate 1.

Figure 7:
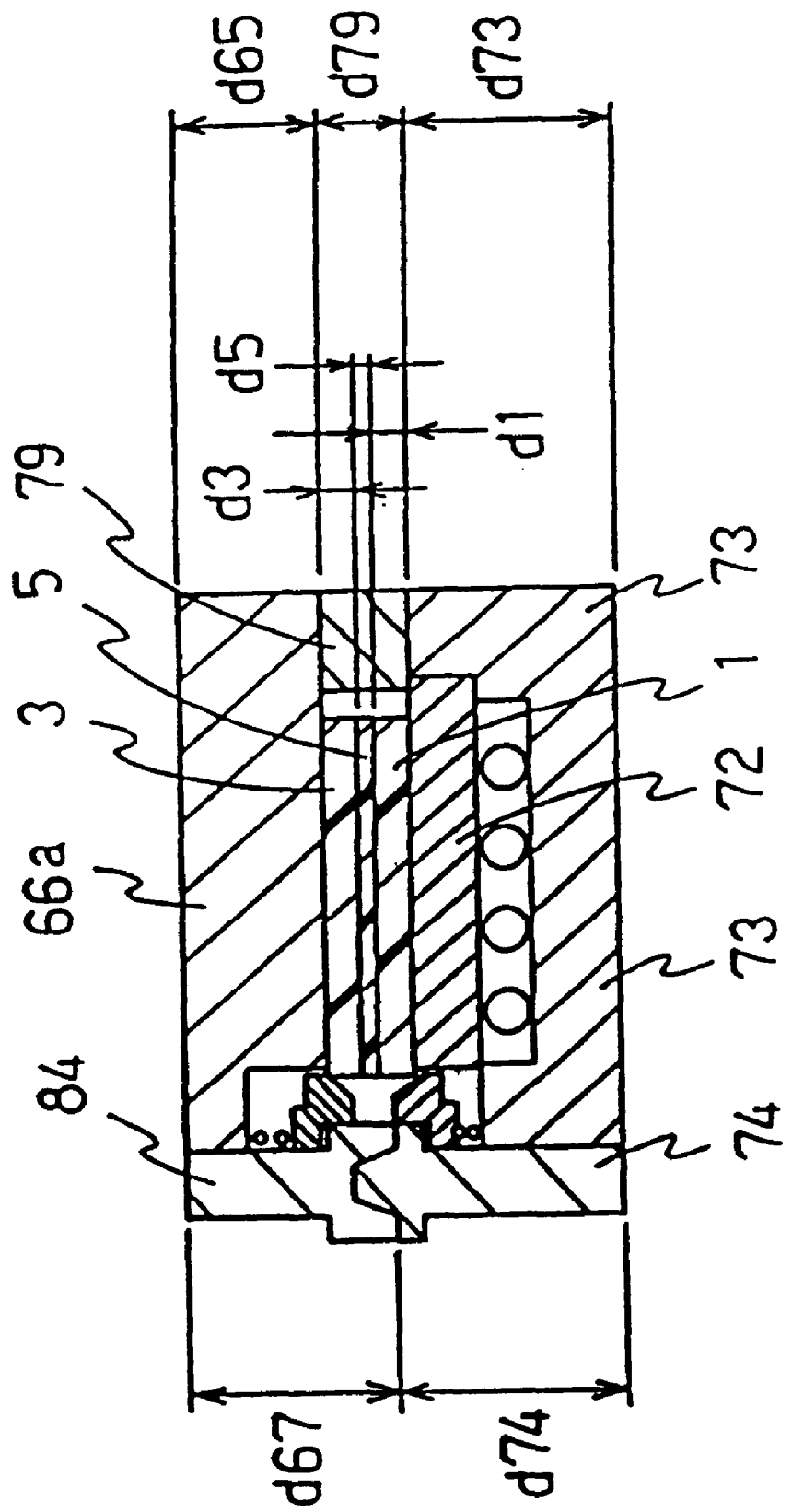
FIG. 7 is a first partial cross sectional view showing the apparatus for manufacturing the optical information recording medium according to the present invention.

FIG. 7 shows a structure of the apparatus according to this embodiment for obtaining a separation layer having a predetermined thickness. FIG. 7 is a partial cross sectional view showing the state of the adhesive-bonding apparatus shown in FIG. 6 in which the upper-portion support section 61 has been moved downwards and the first substrate 1 and the second substrate 3 have been adhesive-bonded to each other through the separation layer 5. To obtain the thickness d5 of the separation layer 5, a spacer 79 having a thickness of d79 is disposed adjacent to the outer ends of the first and second substrates 1 and 3. The thickness d79 of the spacer 79 must satisfy the following equation:

$$d79 = d1 + d3 + d5 \quad (7)$$

where d1 is the thickness of the first substrate 1 and d3 is the thickness of the second substrate 3.

To provide the separation layer 5 having the thickness of d5 at the inner portion of the first and second substrates 1 and 3, the lengths d67 and d74 of the upper shaft 84 and the lower shaft section 74 must satisfy the following equation, assuming that the thickness of the substrate support section 66a is d65 and the thickness of the light-source box 73 is d73:

$$d67 + d74 = d65 + d73 + d1 + d3 + d5 \quad (8)$$

By improving the accuracy of each section, a separation layer 5 in which irregularity in the thickness is inhibited from the inner portion to the outer portion can be obtained.

Figure 8:
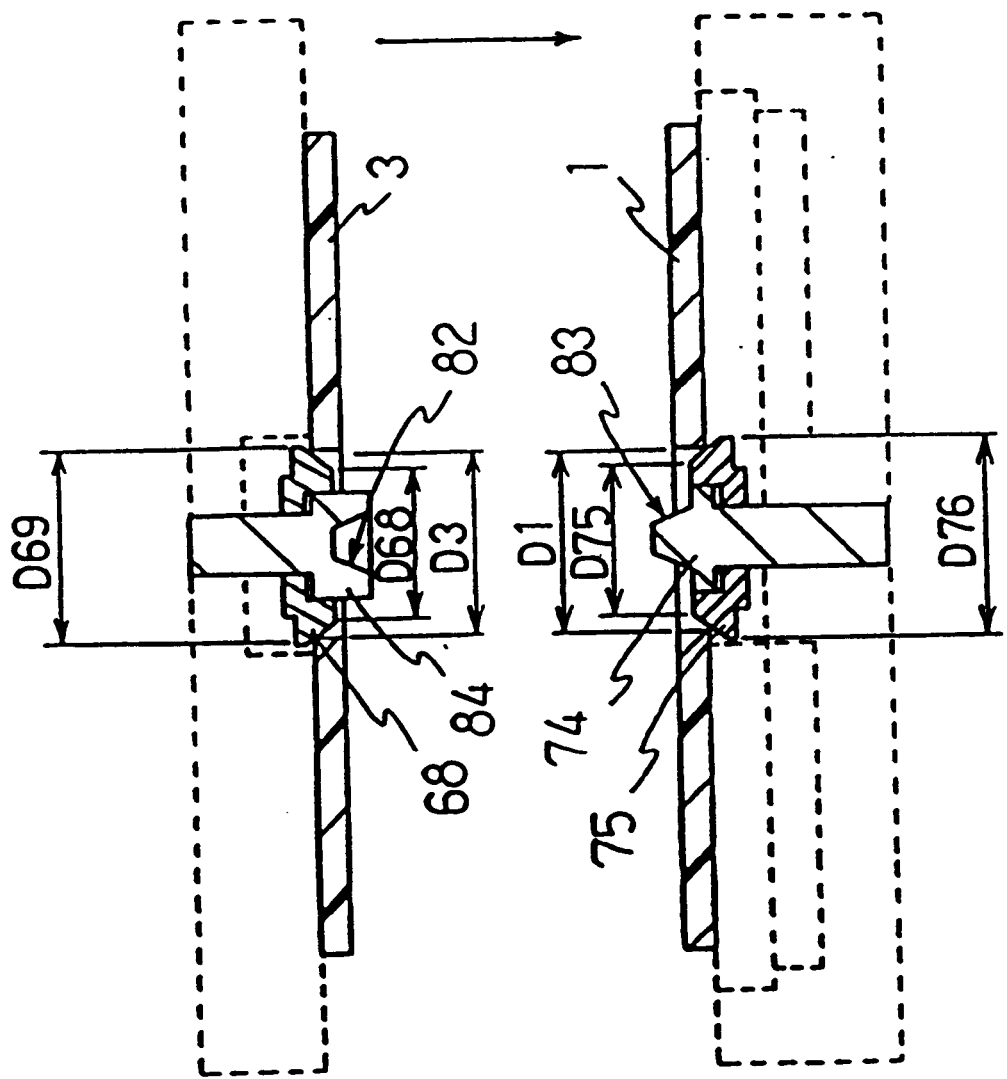
FIG. 8 is a second partial cross sectional view showing the apparatus for manufacturing the optical information recording medium according to the present invention.

Referring to FIGS. 6 and 8, a structure for performing an adhesive-bonding operation with which eccentricity is inhibited between the first and second information layers will now be described. The centers of the upper-portion support section 61 and the lower-portion support section 62 are adjusted by a tapered section 82 of the recess in the upper shaft 84 and a tapered section 83 of the recess in the lower shaft 74. When the upper-portion support section 61 has been moved downwards by the elevation section 63, the tapered section 82 of the recess in the upper shaft 84 and the tapered section 83 of the recess in the lower shaft 74 correct the centers of the upper-portion support section 61 and the lower-portion support section 62. When the horizontal planar portions of the two shafts 67 and 74 are brought into contact with each other at the lowermost position, the deviation of the centers of the upper-portion support section 61 and the lower-portion support section 62 is on the order of several μm or less, which is determined by the machining accuracy of the two shafts 67 and 74.

To keep a constant positional relationship between the first and second substrates 1 and 3 and the upper shaft 84 and the lower shaft section 74, the first and second inner-portion guide sections 68 and 75 are formed, which are in contact with the columnar portions of the two shafts 84 and 74 and which have the same central axis as those of the shafts 84 and 74. The first and second inner-portion guide sections 68 and 75 are formed into tapered shapes having leading ends, the diameters D68 and D75 of which respectively are smaller than the diameters D3 and D1 of the openings in substrates 3 and 1, and other ends, the diameters D69 and D76 of which respectively are larger than the diameters D3 and D1 of the substrates 3 and 1. Each of the first and second inner-portion guide sections 68 and 75 is able to move in the vertical direction of the upper shaft 84 and the lower shaft section 74. The springs 69 and 76 disposed around the two shafts 84 and 74 press the second substrate 3 downwards and pushes the first substrate 1 upwardly. As described above, the central openings of the first and second substrates 1 and 3 having the diameters D1 and D3 are formed with excellent positional accuracy by the injection molding machine. The central openings of the substrates 3 and 1 are received by the tapered sections of the first and second inner-portion guide sections 68 and 75. The substrates 3 and 1 are adsorbed through the adsorption-openings 71 and 78 formed in the substrate support sections 66a and 72. In a state where the tapered sections of the first and second inner-portion guide sections 68 and 75 are in contact with the central openings of the substrates 3 and 1, the substrates 3 and 1 are secured to the surface of the substrate support sections 66a and 72. As a result, the central axis of the information layer of the second substrate 3 and the central axis of the upper-portion support section 61 coincide with each other with an accuracy that is essentially the mechanical accuracy. Similarly, the central axis of the information layer of the first substrate 1 and the central axis of the lower-portion support section 62 coincide with each other with an accuracy that is essencially the mechanical accuracy. By moving the upper-portion support section 61 downwards in the foregoing state, the tapered section 82 of the recess in the upper shaft 84 and the tapered section 83 of the recess in the lower shaft 74 make the center axis of the information layer of the first substrate 1 and the center axis of the information layer of the second substrate 3 coincide with each other.

By using the adhesive-bonding apparatus having the foregoing structure, a recording medium can be obtained in which deviation of the circular arc of the information pits, sample pits or guide grooves formed on the surfaces of the two information layers can be inhibited.

A method of manufacturing the optical information recording medium having the two information layers in such a manner that the adhesive-bonding apparatus shown in FIG. 6 is used will now be described with reference to sequence charts shown in FIG. 9.

Initially, as shown in FIG. 9(a), a first information layer 2 for permitting a penetration of a portion of light beams and having a predetermined reflectance is formed, by sputtering or an evaporation method, on a first substrate 1 having on its surface, information pits corresponding to information signals, or guide grooves for controlling tracking of the light beam or sample pits. As shown in FIG. 9(b), a second information layer 4 having a reflectance higher than that of the first information layer 2 is formed, by sputtering or an evaporation method, on a second substrate 3 having on its surface, information pits corresponding to information signals, or guide grooves for controlling tracking of the light beam or sample pits, and a thickness substantially the same as that of the first substrate 1. Then, the first substrate 1 is secured to a base support section 72. Then, a resin-applying nozzle 64 is used to apply a photosetting resin material 80 to the upper surface of the first information layer 2, as shown in FIG. 9(c). Then, the second substrate 3 is placed on a substrate support section 66a, and then an elevation section 63 is operated to move an upper-portion support section 61 downwards to come into contact with a spacer 79. Then, the second substrate 3 and the first substrate 1 are adhesive-bonded to each other with a separation layer 5 at an interval, which is the thicknesses d5 of the separation layer 5 (see FIG. 9(d)). Then, as shown in FIG. 9(e), the outer surface of the first substrate 1 is irradiated with light beams 73 emitted from a light source 81 so that the resin material 80 is hardened so that the separation layer 5 is formed. As a result of the foregoing process, a recording medium having the two information layers 2 and 4 can be obtained.

By employing the foregoing method, the process for removing the master is not required to obtain a recording medium having a double layer structure such that substrates having information pit surfaces formed previously are simply adhesive-bonded to each other. As a result, the manufacturing yield can be improved.

Although the structure has been described in which the resin material 80 is applied to the upper surface of the first information layer 2, the resin material 80 may be applied to the upper surface of the second information layer 4.

A method of manufacturing a light recording medium having four information layers in such a manner that adhesive-bonding apparatus shown in FIG. 6 is used will now be described with reference to the sequence charts shown in FIG. 10.

As shown in FIG. 10(*a*), initially, a first information layer 59 for permitting a penetration of a portion of light beams and having a predetermined reflectance is formed, by sputtering or an evaporation method, on a first substrate 59 having on its surface, information pits corresponding to information signals, or guide grooves for controlling tracking of the light beam or sample pits.

As shown in FIG. 10(*b*), a second information layer 61 having a reflectance higher than that of the first information layer 59 is formed on a second substrate 60 having on its surface, information pits corresponding to information signals, or guide grooves for controlling tracking of the light beam or sample bits, and a thickness substantially the same as that of the first substrate 1.

Then, the first substrate 58 is secured to a base support section 72. Then, a resin-applying nozzle 64 is used to apply a photosetting resin material 80 to the upper surface of the first information layer 59, as shown in FIG. 10(*c*). Then, the second substrate 60 is placed on a substrate support section 66*a* of the adhesive-bonding apparatus, and then an elevation section 63 is operated to move an upper-portion support section 61 downwards to come into contact with a spacer 79. Then, the second substrate 60 and the first substrate 58 are adhesive-bonded to each other with a separation layer 62 at an interval, which is the thicknesses d62 of the separation layer 62. Then, the outer surface of the first substrate 58 is irradiated with light beams 102 emitted from a light source 81 so that the resin material 80 is hardened so that the separation layer 62 is formed (see FIG. 10(*d*)). As a result of the foregoing process, a first recording medium 101 having two information layers on one side thereof can be obtained.

The foregoing method is different from the process shown in FIG. 9 in which the first and second substrates 1 and 3 having similar thicknesses are adhesive-bonded to each other, in that the thickness of the second substrate 60 to be adhesive-bonded with the first substrate 58 is not limited in this embodiment. In the foregoing case, the thickness of the spacer 79 and the lengths of the upper shaft 84 and the lower shaft 74 must be changed.

As a result of a process (see FIGS. 10(*e*) to 10(*h*)) similar to that shown in FIGS. 10(*a*) to 10(*d*), a second medium 103 having two layers formed on one surface thereof is obtained by adhesive-bonding the third substrate 63 and the fourth substrate 65. Referring to FIGS. 10(*e*) to 10(*h*), reference numeral 64 represents a third information layer, 66 represents a fourth information layer, 67 represents a second separation layer, and 104 represents a light beam emitted from the light source 81. In the foregoing case, it is preferable that the thickness of the first substrate 58 and that of the third substrate 63 be substantially the same. Moreover, it is preferable that the thickness of the second substrate 60 and that of the fourth substrate 65 be substantially the same. The second and fourth substrates 60 and 65 may be formed by a method other than the method employed to form the first and third substrates 58 and 63. To maintain the thin substrate serving as the recording medium, for example, a Photo-Polymerization method may be employed, permitting the substrate to be made thinner.

Then, an adhesive-bonding apparatus similar to that shown in FIG. 6 is used to adhesive-bond the first medium 101 having two layers formed on one surface thereof and the second medium 103 having two layers formed on one surface thereof to each other. Initially, as shown in FIG. 10(*i*), a photosetting resin 105 is applied to the upper surface of the second substrate 60 of the first medium 101 having two layers formed on one surface thereof. Then, as shown in FIG. 10(*j*), the second substrate 60 and the fourth substrate 65 are adhesive-bonded to each other, followed by irradiating the outer surface of the first substrate 58 with the light beams 106 emitted from the light source 81 so that the resin material 105 is set to form an adhesive layer 68. As shown in FIG. 10(*j*), the lengths of the spacer 79, the upper shaft 84 and the lower shaft 74 must be changed to correspond to the overall length of the recording medium, the lengths of the first and second separation layers 62 and 67 and the lengths of the first to fourth information layers 59, 61, 64 and 66. When the exposure process shown in FIG. 10(*j*) is performed, the light beams 106 emitted from the light source 81 penetrate the first and second information layers 59 and 61, and then reach the resin material 105. Therefore, the quantity of the light beams 106 must be enlarged as compared with the exposure processes, for example, as shown in FIG. 9(*e*), 10(*d*) or 10(*h*).

As the resin material 105 for use when the first and second mediums 101 and 103 each having two layers formed on one surface thereof are adhesive-bonded to each other, a resin that absorbs light beams may be employed. A resin other than the photosetting resin may be employed. For example, a heat setting resin, a hot melt adhesive agent or another adhesive agent may be employed. Therefore, the irradiation with light beams may be omitted from the process shown in FIG. 10(*j*).

By employing the foregoing method, the process for removing the master is not required. By sequentially adhesive-bonding substrates each having the surface comprising the information pits formed previously, a recording medium having a four-layer structure can be obtained. As a result, the manufacturing yield can be improved. The recording medium having the four-layer structure can be obtained by repeating three times the adhesive-bonding process required to obtain the recording medium having the double-layer structure. That is, the recording medium having the four-layer structure can be realized by using basically the same manufacturing apparatus. Thus, it can be realized by a method similar to that required to obtain the recording medium having the double-layer structure.

A recording and reproducing apparatus for recording and reproducing on the optical information recording medium according to the present invention, as manufactured by the foregoing method, will now be described with reference to FIG. 11. As Oshown in FIG. 11, the recording and reproducing apparatus according to this embodiment comprises an optical disk 111 that is basically an optical information recording medium having a plurality of information layers; a spindle motor 112 for rotating the optical disk; an optical pickup section 113 for converging light beams, such as laser beams, emitted from a light source 121; and five circuit systems for controlling the spindle motor 112 and the optical pickup section 113. A first circuit system is a light modulating system 114 for operating the light source 121 of the optical pickup section 113. A second circuit system is a control system 115 for controlling the operation of the light beams to cause light beams emitted from the optical pickup section 113 to be converged onto the optical disk 111 and tracking for causing the light beams to follow the information pits or the guide grooves. A third circuit system is a signal reproduction system 116 for reading information signals formed on the optical disk 111. At least one of the foregoing three circuit systems has two or more types of condition setting functions to set an optimum condition to each of the information layers. A fourth circuit system is a layer selection system 117 for switching the condition of the three circuit systems in accordance with the information layer to which the light beams are to be detected. A fifth circuit system is a system control system 118 for controlling the timing of the four circuit systems.

The present invention has a structure such that the layer selection system 117 is used to reproduce recorded information to select the optimum condition of the foregoing circuit systems to enable information to be recorded onto a plurality of information layers while inhibiting errors in information to be reproduced from the plural information layers.

When the information signals are reproduced from the optical disk 111, the system control system 118 controls the rotation control section 119 to rotate the spindle motor 112 so as to rotate the optical disk 111 at constant speed. A control signal indicating the reproduction state is supplied to a laser drive section 120 so that the electric current flowing to the light source 121 is controlled in such a manner that the intensity of light beams to be emitted from the optical pickup section 113 is set at a reproduction power value as instructed by the system control system 118. The light beams emitted from the light source 121 pass through the optical system of the optical pickup section 113 and an objective lens 122 disposed at the rear portion so that the light beams are made to be converged beams with which the optical disk 111 is irradiated.

The light beams reflected by the optical disk 111 again pass through the objective lens 122 and the optical system in the optical pickup section 113 so as to be made incident upon a photodetector 123 having a light receiving surface which is divided into sections. The photodetector 123 photoelectrically converts the incidental light beams to transmit a signal having the voltage corresponding to the change in the quantity of light on each of the light receiving surfaces to the signal reproduction system 116. The signal transmitted from the photodetector 123 is amplified by a pre-amplifier 124 so that low frequency components in the signal are used to control the position of the light beam.

A focus control section 126 uses a portion of the signal transmitted from each of the light receiving surfaces of the photodetector 123 to obtain a focus error signal and operate a voice coil 125 by using the focus error signal. As a result, the objective lens 122 is controlled to move slightly in the perpendicular direction with respect to the surface of the optical disk 111 so that the light beams are converged onto the surface of the information layer of the optical disk 111. The system control system 118 transmits, to a layer selection system 117, a layer selection signal for appointing an information layer to be focused in response to control signal S03. The layer selection system 117 switches the operations of the light modulating system 114, the control system 115 and the signal reproduction system 116 in accordance with the information layer. As a result, signals in any information layer on the optical disk 111 can be reproduced.

A layer identification section 132 demodulates a layer identification signal from the signal transmitted from a binary-coding section 130 to identify the information layer that is being focused. If the information layer that is being focused is not the subject information layer, a focus jumping circuit 133 sequentially shifts the focusing position among the information layers. The focus jumping circuit 133 superimposes the pulse voltage for instantaneously moving a voice coil 125 in the perpendicular direction with respect to the optical disk 111 on the output signal from the focus control section 126. As a result, the light beam can be converged onto the subject information layer.

A tracking control section 127 obtains a tracking control signal from a combination of the other output signals from the photodetector 123 in such a manner that the light beam follows the information pits or the guide grooves, and then slightly moves the voice coil 125 in a direction of the radii of the optical disk 111. When the information layer of a reproduction only type is reproduced, a polarity inverter 128 switches the tracking polarity among the information layers in accordance with an instruction issued from the layer selection system 117 so that a phase difference method or a 3-beam method is employed to perform tracking in such a manner that the light beams reproduce the information pits of the information layer. In a case where the information layer of a recording and reproducing type is reproduced, the polarity inverter 128 switches the tracking polarity or the tracking method among the information layers in accordance with an instruction issued from the layer selection system 117. Thus, the information pits of the information layer of the recording and reproducing type are reproduced by tracking by a push-pull method in a case where the information layer has guide grooves or by a sample servo method in a case where the information layer is composed of wobble pits. By switching the tracking method according to the type of the information layer, the recording density of both of the information layers can be raised.

A tracking jumping circuit 129 superimposes the pulse voltage for instantaneously moving the voice coil 125 in the direction of the radial of the optical disk 111 on the output signal from the tracking control section 127. As a result, the light beam can be moved onto the surface of the subject track.

In accordance with the output from the tracking control section 127, the polarity inverter 128 inverts the polarity thereof in accordance with the direction of the information pits formed on the information layer, and whether the light beam is allowed to follow the land or groove of the guide groove.

In the case where the recording medium has been manufactured by using the first and second substrates 1 and 3 obtained by the same mastering process as shown in FIG. 2(a), the directions of the pits are inverted between the first and second information layers 2 and 4 when viewed from a position upon which the light beam 7 is made incident. In the case of a double-layer medium of the foregoing type, the focusing position is moved between the first and second information layers 2 and 4 by the focus jumping circuit 133. Simultaneously, the polarity inverter 128 switches the tracking polarity between the first and second information layers 2 and 4. As a result, the light beam can be moved instantaneously onto the information pit of the subject information layer. Therefore, the foregoing method is able to reduce the time required to make an access between the information layers when information is reproduced.

The binary-coding section 130 of the signal reproduction system 116 uses the high frequency components of the signal supplied from the pre-amplifier 124 to make a comparison between the level of the foregoing signal and a reference level so as to convert the signal into a binary-coded signal. Then, the decoder 131 decodes the binary-coded signal in accordance with a predetermined signal format. As a result, the information signal is demodulated from the recording mark formed on the optical disk 111. Then, demodulation information S02 is transmitted to an external unit in accordance with an instruction issued from the system control system 118.

If necessary, conditions for reproducing or recording the information layer formed in a specific region on the optical disk 111 are demodulated by the layer identification section 132. The layer identification section 132 also has a function capable of demodulating the shape of the information layer and the like as well as identifying the information layer. It is preferable that the foregoing information be recorded during the process for manufacturing the recording medium. The contents of the information include identification information for identifying whether the information layer is a reproduction only information layer or a recording and reproducing information layer or information for correcting the differences in the characteristics among the information layers. That is, the contents are information about the optimum condition for irradiating each information layer with light, the optimum condition for performing the focus control or the tracking control and the optimum condition when the reproduced signal is demodulated.

In a case where information is recorded on a plurality of information layers, initially the system control system 118 causes the light modulating system 114 to receive recording information S01 composed of information to be recorded at a predetermined timing. The light modulating system 114 initially causes an encoder 134 to convert the recording signal into a recording signal having a predetermined format, and then causes the laser drive section 120 to modulate the intensity of light to be emitted from the light source 121 in accordance with the condition of a waveform setter 135, which divides a pulse or sets a change in the intensity. Light having the modulated intensity is absorbed into the recording layer on the optical disk 111. As a result, the reproducing mark can be formed on the recording layer on the optical disk 111 so that information is recorded.

Note that the waveform setter 135 has recording patterns which are optimum for recording on the respective information layers and changes the output therefrom in synchronization with the output from the layer selection system 117. The laser drive section 120 modulates the intensity of the light to be emitted from the light source 121 in accordance with the modulated waveforms corresponding to the respective information layers.

By employing the foregoing structure, the information signals can be reproduced from the plural information layers under optimum conditions. Moreover, the information signals can be recorded onto the plural information layers under optimum conditions and recorded information can be reproduced.

The specific operations of the components of the recording and reproducing apparatus will now be described in detail.

Figure 12:
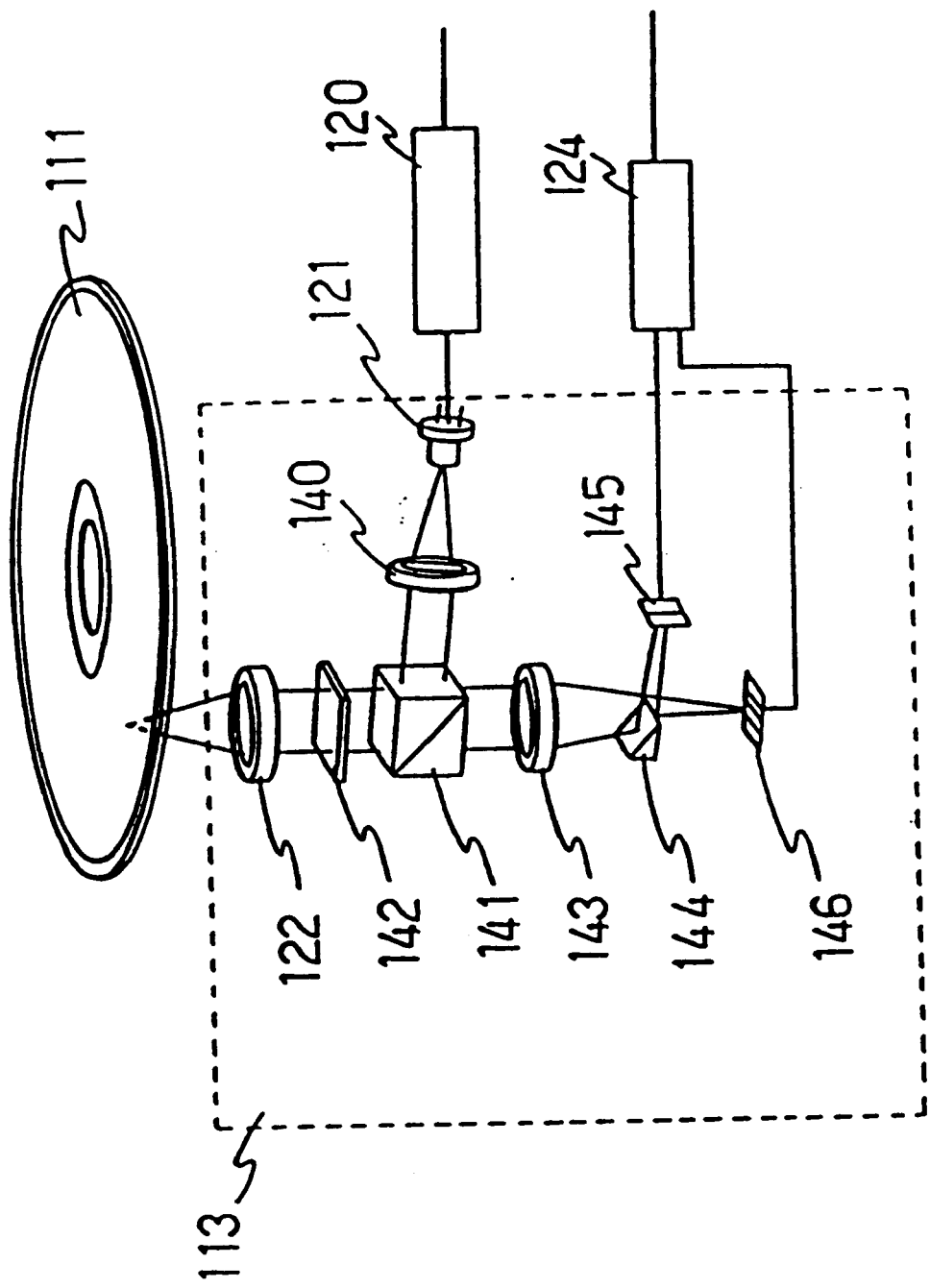
FIG. 12 is a schematic view showing the structure of an optical pickup of the apparatus for optically recording and reproducing information according to the present invention.

FIG. 12 shows the structure of the optical pickup section. In this embodiment, a knife edge method is employed as the focusing method and a push-pull method is employed as the tracking method.

As shown in FIG. 12, light emitted from the light source 121 passes through a collimator lens 140 so as to be formed into parallel beams, followed by being reflected by a beam splitter 141. Then, the reflected beams pass through a λ/4 plate 142 and the objective lens 122 so that the optical disk 111 is irradiated with the light beams. Light reflected by the optical disk 111 passes through the objective lens 122, the λ/4 plate 142 and the beam splitter 141, and then passes through a lens 143, and then a portion of the light beams is reflected and is made incident upon the photodetector 145 having a plurality of light receiving surfaces for performing the tracking operation. An output from each of the light receiving surfaces of the photodetector 145 is amplified by the pre-amplifier 124 so that a tracking error signal is obtained from a difference signal.

On the other hand, light which, is not reflected by the mirror 144 is made incident upon the photodetector 146 having a plurality of light receiving surfaces for performing the focusing operation. An output from each of the light receiving surfaces of the photodetector 146 is amplified by the pre-amplifier 124 so that a focus error signal is obtained from the difference signal. Referring to FIG. 12, reference numeral 113 represents the optical pickup and 120 represents the laser drive section.

Figure 13:
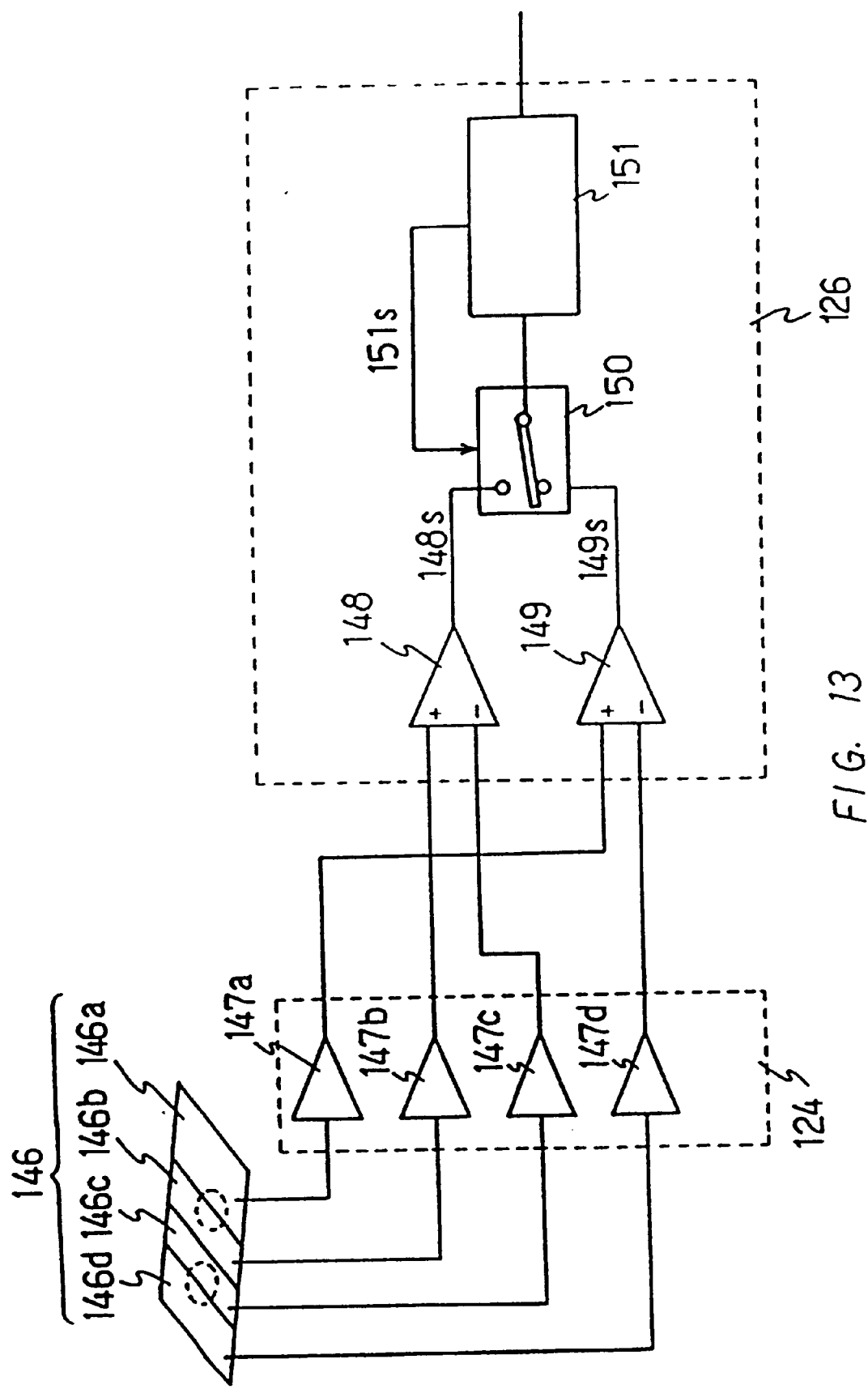
FIG. 13 is a schematic view showing the structure of a focus control section of the apparatus for optically recording and reproducing information according to the present invention.

FIG. 13 shows a portion of a focus control section for performing the focus control in accordance with the output from the photodetector. Although a usual knife edge method employs a photodetector having a light receiving surface divided into two sections, this embodiment has an arrangement such that the photodetector 146 has a light receiving surface divided into at least four sections, as shown in FIG. 13. The reason for this is that if a photodetector having the light receiving surface divided into two sections is used, then an operation of obtaining a servo signal from a subject information layer encounters the problem of the servo signal being distorted because a portion of light reflected by other information layers is made incident upon the photodetector. Although reduction in the area of the light receiving portion of the photodetector enables the distortion of the servo signal to be inhibited, another problem arises in that a range for pulling focusing is excessively limited.

Accordingly, this embodiment has a structure such that the light receiving surface of the photodetector 146 is divided into at least four sections. Moreover, a method is employed in which the focus detection region is switched between a focus pulling stage and the servo operation stage. As shown in FIG. 13, the photodetector 146 has the light receiving surface divided into light receiving surfaces 146a, 146b, 146c and 146d. An output from each of the light receiving surfaces 146a, 146b, 146c and 146d of the photodetector 146 is amplified by each of amplifiers 147a, 147b, 147c and 147d so that two types of focus error signals 148s and 149s are obtained by difference amplifiers 148 and 149. Then, a switching unit 150 selects either of the focus error signal 148s or 149s. The selected focus error signal 148s (or 149s) passes through a focus operation circuit 151 and the focus jumping circuit (see FIG. 11), and then operates the optical pickup section 113 (see FIG. 11).

The focus error signal will now be described with reference to FIG. 14 in both of a case where the photodetector for the focusing operation is divided into two sections and a case where the same is divided into four sections. The axis of abscissa stands for focus-directional positions in which the positions of the two information layers are indicated by L1 and L2. FIG. 14(a) shows a case where the light-receiving surface is divided into two sections and the light receiving surface is large. FIG. 14(b) shows a case where the light receiving surface is divided into two sections and the light receiving surface is small. FIG. 14(c) shows a case where the light receiving surface is divided into four sections and the outer light receiving surfaces 146a and 146d are used. FIG. 14(d) shows a case where the light receiving surface is divided into four sections and the inner light receiving surfaces 146*b* and 146*c* are used. In the case shown in FIG. 14(*a*) where the light receiving surface is divided into two sections and a photodetector 151 having a large light receiving surface is employed, and in a case where a focal point exists near focus beam F1 from an information layer, reflected light F2 from another information layer is made incident upon a portion of the light receiving surface. Therefore, the focus error signal is distorted and, therefore, a focal-point positional error dF occurs. In the case shown in FIG. 14(*b*) where the photodetector 152 is used which has the light receiving surface divided into two sections and having a small light receiving surface area, receipt of leaked light beam from another information layer can be prevented. Moreover, S-figure curves of the two focus error signals appear at the positions corresponding to the positions L1 and L2 of the information layers so that the servo operation is enabled. However, the realized focus pull-in range M2 is smaller than pull-in range M1 in the case shown in FIG. 14(*a*) in which the light receiving surface has a large-area. Thus, the operation becomes unstable if the recording medium is warped or has an irregularity on its surface.

To overcome the foregoing problems, this embodiment employs the photodetector 146 having a light receiving surface divided into four sections. Note that the light receiving surface is formed in such a manner that the reflected beam F1 from either information layer is positioned at substantially the central position of a division line between the light receiving surfaces 146*a* and 146*b* and the reflected beam F2 from another information layer is positioned at substantially the central position of a division line between the light receiving surfaces 146*c* and 146*d*. In a case where the distance between the centers of the reflected beams F1 and F2 on the light receiving surface is Lf and the size of each of the spots of the reflected beams F1 and F2 on the light receiving surface is Ld, width 146*w* of the outer light receiving surfaces 146*a* and 146*d* is set to be larger than Lf and smaller than Lf+Ld. FIG. 14(*c*) shows a focus error signal in a case where the light receiving surface is divided into four sections and the outer light receiving surfaces 146*a* and 146*b* are used. Since the light receiving surfaces are apart from the reflected light beams F1 and F2 from the two information layers, an S-figure curve appears, similar to the case where one information layer is present. If a servo operation is performed in response to the foregoing signal, the focusing position is located between the position L1 of one of the information layers and the position L2 of the other information layer. In the foregoing case, a large range M3 can be obtained as the range in which the focusing signal is found. FIG. 14(*d*) shows a focus error signal in a case where the light receiving surface is divided into four sections and inner light receiving surfaces 146*b* and 146*c* are used. The focus error signal is similar to that of the case shown in FIG. 14(*b*) in which the light receiving surface is divided into two sections and the light receiving surface has a small area.

Figure 14:
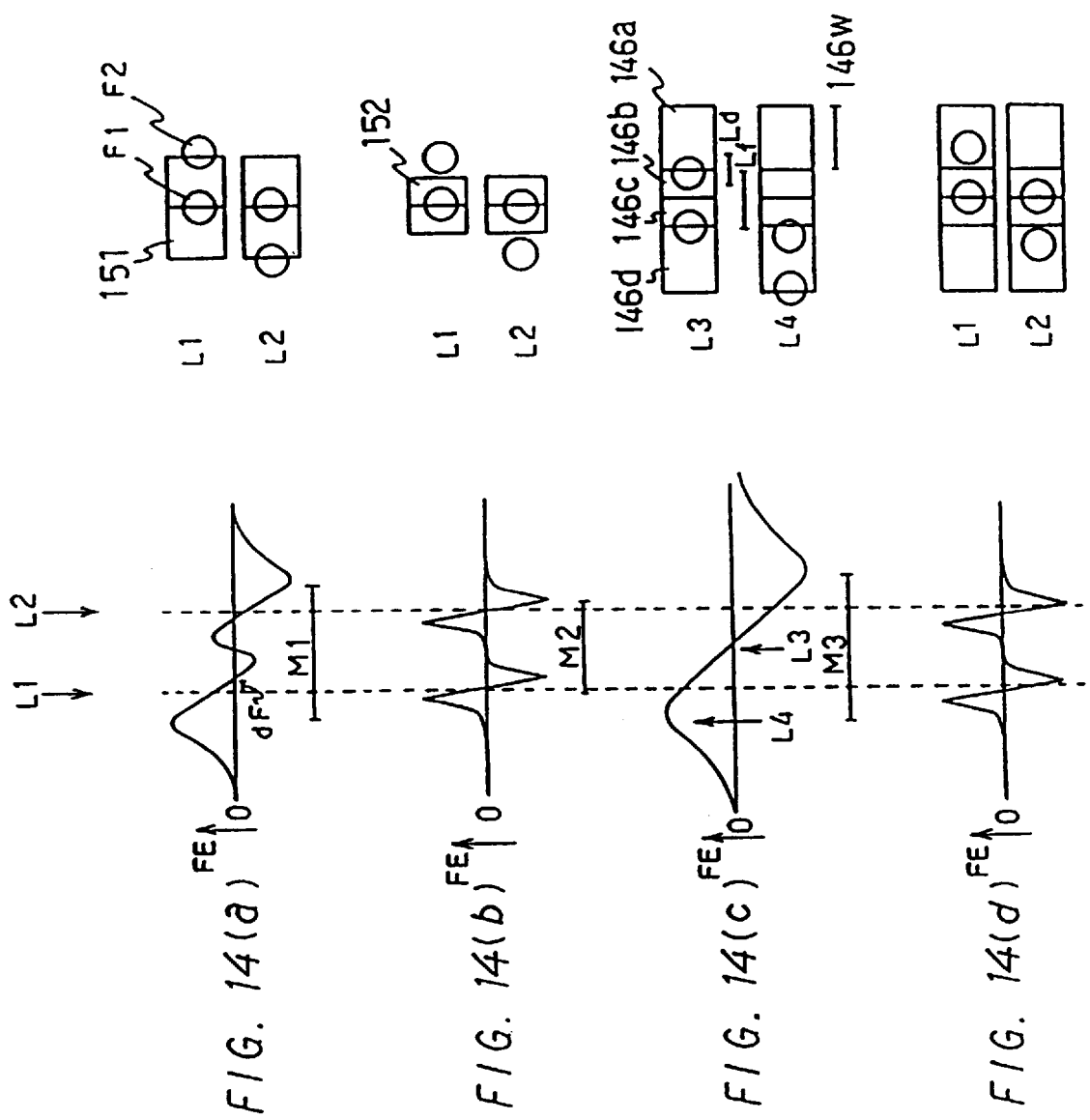
FIG. 14 is a graph showing the waveforms of focus error signals obtainable from the two information layers of the optical information recording medium according to the present invention.

The photodetector 146 having the light receiving surface divided into four sections according to this embodiment is able to realize a large focus pull-in range and stable focusing with respect to the two information layers by switching the focus error signal in the case shown in FIG. 14C and the focus error signal shown in FIG. 14(*d*).

When focusing is pulled, the switching unit 150 selects a difference signal 149*s* from the outer light receiving surfaces 146*a* and 146*d* of the photodetector 146 so that the focus operating circuit 151 starts the focusing operation. In the foregoing state, the focusing point is positioned between the two information layers.

When completion of the operation for pulling focusing has been confirmed by the focus operating circuit 151, the focus operating circuit 151 transmits a focus operation completion signal 151*s* to the switching unit 150. In response to the focus operation completion signal 151*s*, the switching unit 150 selects the difference signal 148*s* which is any of outputs from the inner light receiving surfaces 146*b* and 146*c* of the photodetector 146 so that either of the information layers is subjected to focusing. Then, the tracking operation is performed in a predetermined region to determine whether or not the subject information layer has been subjected to focusing. If an information layer which is not the intended subject has been subjected to focusing, the focus jumping circuit 133 moves the focusing position to the subject information layer. During the foregoing process, the switching unit 150 does not perform the switching operation.

Figure 15:
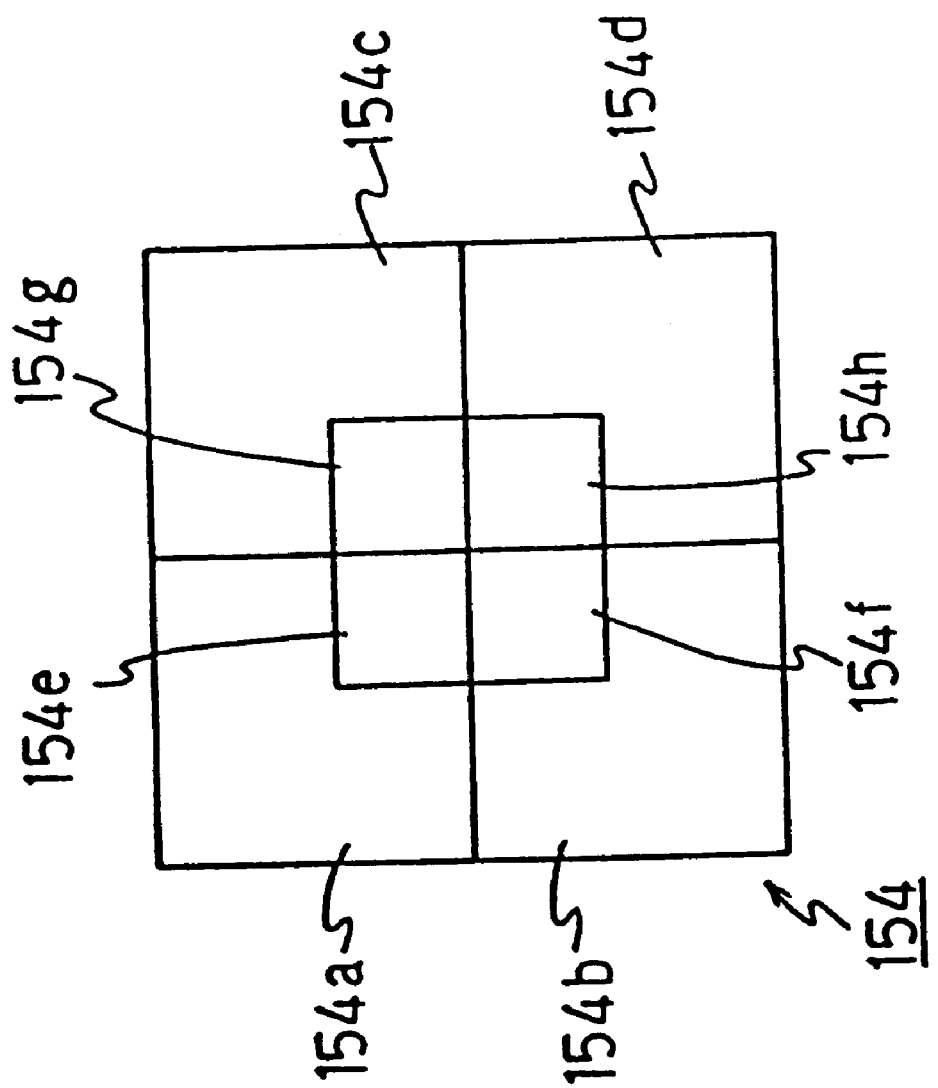
FIG. 15 is a schematic view showing a photodetector of the apparatus for optically recording and reproducing information.

Although the description has been directed to a structure which employs the knife edge method as the focusing method, the focusing method is not limited to this. For example, an astigmatism method may be employed. If the astigmatism method is employed, a cylindrical lens is disposed at the position of the mirror 144 shown in FIG. 12 and a photodetector 154 having a light receiving surface divided into 8 sections as shown in FIG. 15 is disposed near the photodetector 146. In the case where the astigmatism method is employed, outputs from the light receiving surfaces 154*a*, 154*b*, 154*c* and 154*d* in the vicinity of the photodetector 146 are used similar to the knife edge method. After the focus pull-in operation has been completed, outputs from the light receiving surfaces 154*e*, 154*f*, 154*g* and 154*h* in the central portion of the photodetector 146 are used so that a focus error signal is obtained.

By employing the foregoing structure, a stable servo operation for each of plural information layers can be performed while maintaining the focus pull-in performance similar to that obtainable from the conventional structure.

The quality of a recording medium having plural information layers depends upon the irregularity of the shapes of the information pits or guide grooves. The quality of the recording and reproducing apparatus depends upon the distortion of the intensity distribution of the light beams or dispersion of the sensitivity of the photodetector or the like. Therefore, error voltage is generated in the focus error signal or the tracking error signal due to interference between the information layers or change in the thickness of the separation layer when the servo operation is performed.

Figure 11:
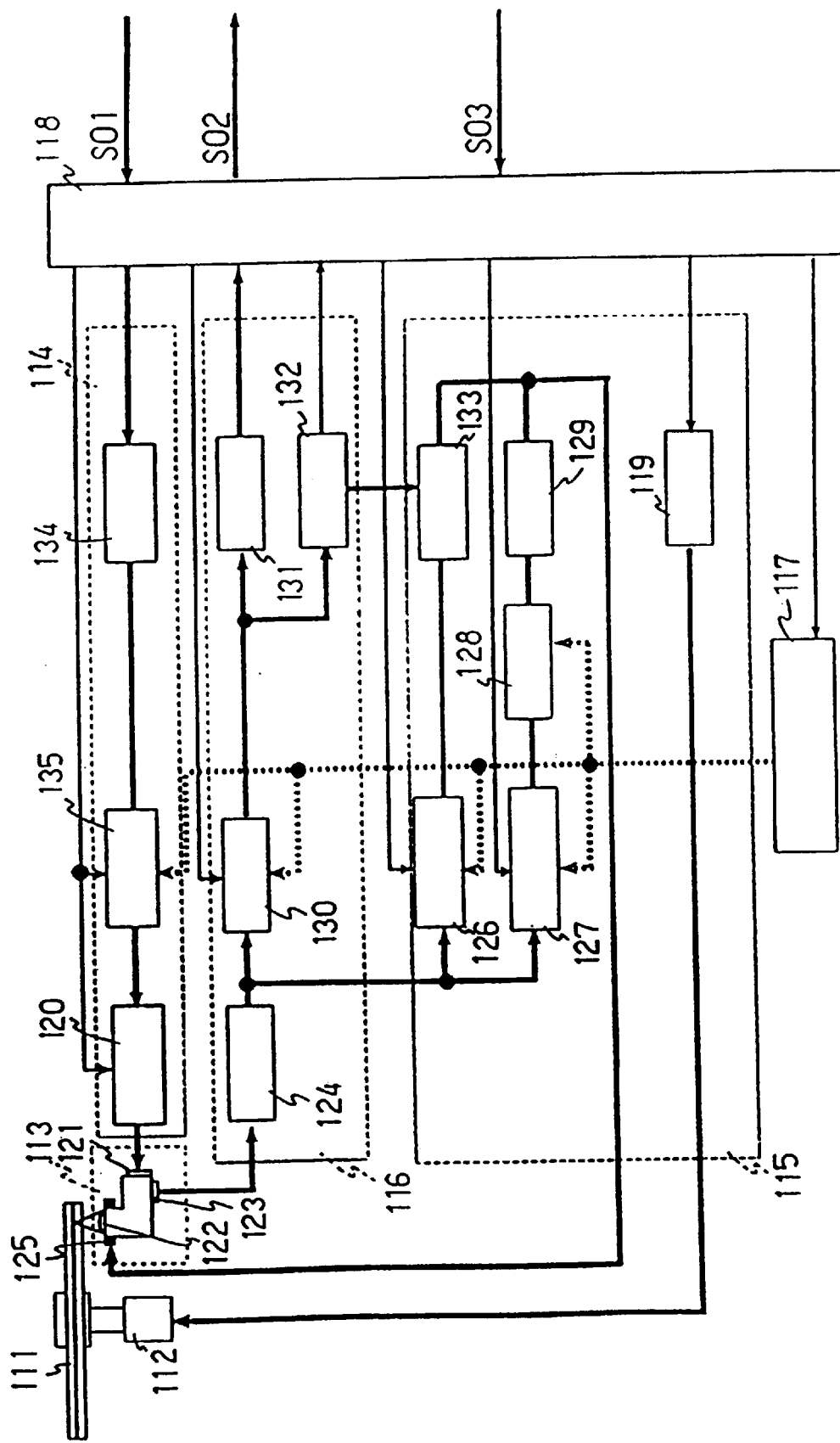
FIG. 11 is a block diagram showing the structure of an apparatus for optically recording and reproducing information according to the present invention.

In order to correct an error in the focus control signal or the tracking control signal, the focus control section or the tracking control section is offset-adjusted in synchronization with the setting of the layer selection system 117 (see FIG. 11). For example, a fine offset is added to the focus control signal so that focus deviation generated between the layers is corrected. Also a fine offset is added to the tracking control signal so that tracking deviation is corrected. Thus, an optimum light convergent state can be realized in each of the information layers.

Figure 16:
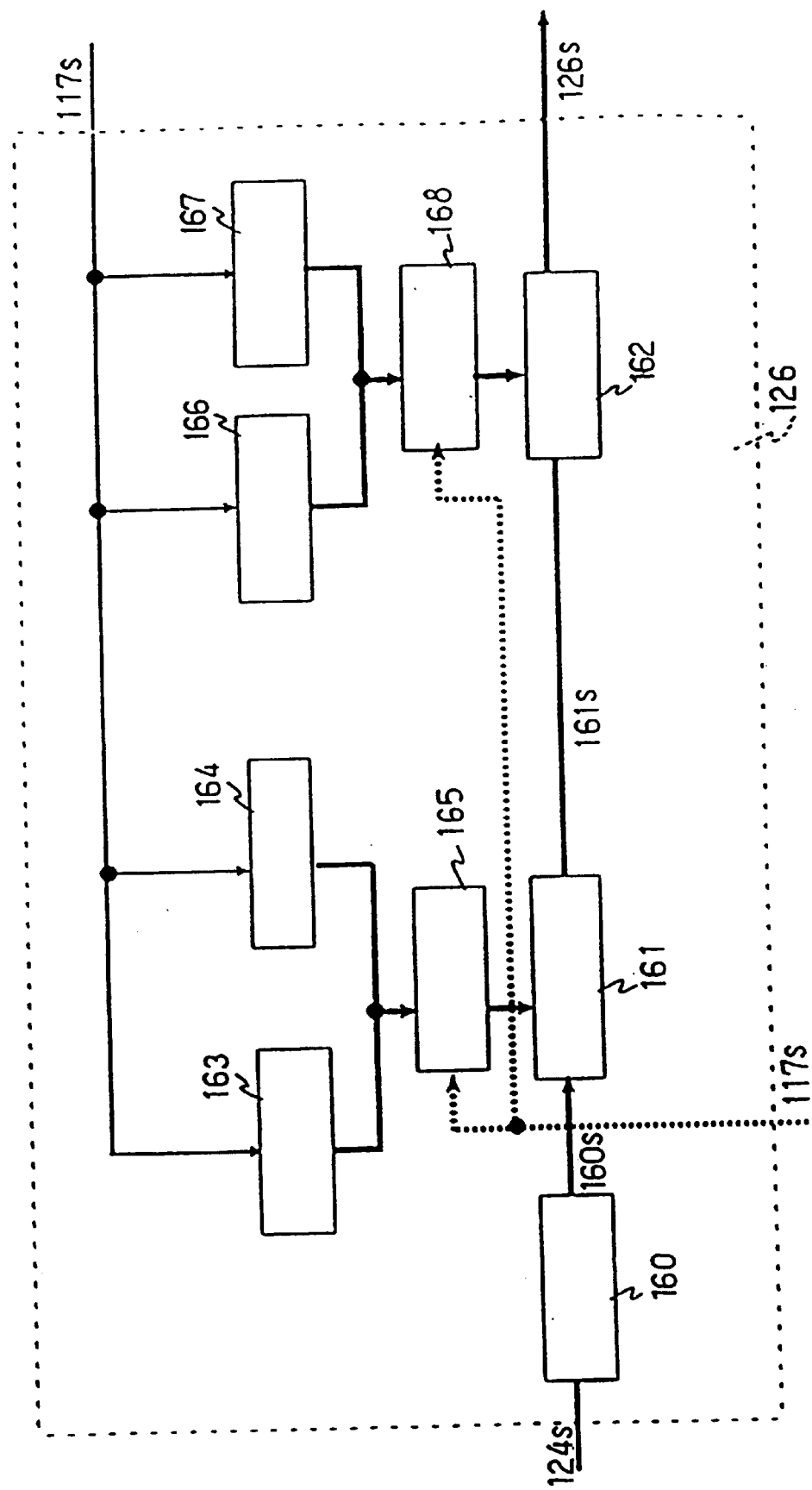
FIG. 16 is a schematic view showing the structure of a focus control section of the apparatus for optically recording and reproducing information according to the present invention.

FIG. 16 shows the focus control section in detail. As shown in FIG. 16, a focus error signal 160*s* is produced by a focus error detection circuit 160, obtained from a signal in the output signal 124*s* from the pre-amplifier 124 (see FIG. 12) and relating to the focus control. Thus, a focus control signal 126*s* can be obtained by a focus operation circuit 162 through an offset compensation circuit 161. The focus control signal 126*s* is transmitted to the optical pickup section 113 (see FIG. 11) so that the voice coil 125 (see FIG. 11) is operated and the focus control is performed.

The offset compensation circuit 161 has a structure capable of setting a plurality of offset levels in response to a signal supplied from the outside. An offset setting unit for setting the offset to be supplied to the offset compensation circuit 161 comprises an offset setting unit 163 for setting an offset when focusing of the first information layer 2 has been performed; and an offset setting unit 164 for setting an offset when focusing of the second information layer 4 has been performed. An offset selector 165 responds to an output 117s from the layer selection system 117 (see FIG. 11) to transmit the offset value of either of the offset setting unit 163 or the offset setting unit 164.

On the other hand, the focus operation circuit 162 receives a signal 161s transmitted from the offset compensation circuit 161 and transmits a focus control signal 126s for making the signal 161s to be zero so as to operate the voice coil 125. The gain setting unit for setting the gain of a circuit when the focusing operation is performed comprises a gain setting unit 166 for setting the gain in the case of the first information layer 2; and a gain setting unit 167 for setting the gain in the case of the second information layer 4. A gain selection unit 168 responds to an output 117s from the layer selection system 117 to transmit a signal from the gain setting unit 166 or the gain setting unit 167. By employing the foregoing structure, an optimum focusing state can be set with respect to the two information layers.

Figure 17:
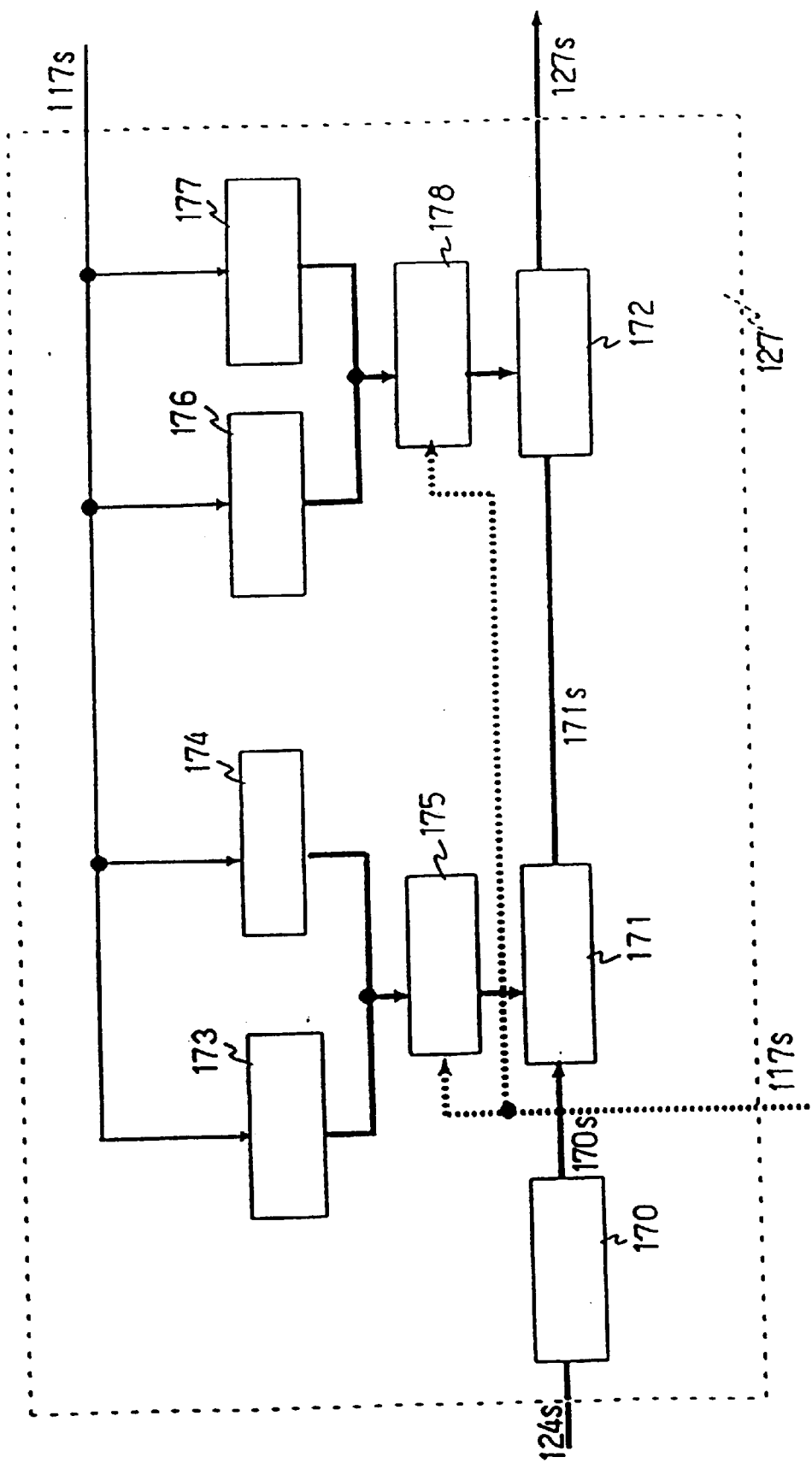
FIG. 17 is a schematic view showing the structure of a tracking control section of the apparatus for optically recording and reproducing information according to the present invention.

As for the tracking control, the setting of an optimum state between the information layers enables reproduction or recording and reproducing to be performed more satisfactorily. FIG. 17 shows the tracking control section in detail. As shown in FIG. 17, a tracking error signal 170s can be obtained by a tracking error detection circuit 170 from a signal relating to the tracking control in an output signal 124s from the pre-amplifier 124. A tracking control signal 127s can be obtained by a tracking operation circuit 172 through an offset compensation circuit 171. The tracking control signal 127s passes through the polarity inverter 128 (see FIG. 11) and is supplied to the optical pickup section 113. Thus, the voice coil 125 is operated so that the tracking control is performed.

The offset compensation circuit 171 is structured to be capable of setting a plurality of offset levels in response to a signal supplied from the outside. The offset setting unit for setting offset to be supplied to the offset compensation circuit 171 comprises an offset setting unit 173 for setting the offset when focusing of the first information layer 2 has been performed; and an offset setting unit 174 for setting the offset when focusing of the second information layer 4 has been performed. The offset selector 175 responds to-an output 117s from the layer selection system 117 (see FIG. 11) to transmit an offset value of the offset setting unit 173 or the offset setting unit 174.

On the other hand, the tracking operation circuit 172 receives a signal 171s transmitted from the offset compensation circuit 171 and transmits a tracking control signal 127s with which the signal 171s is made to be zero so that the voice coil 125 is operated. The gain setting unit for setting the gain when the tracking operation is performed comprises a gain setting unit 176 for setting the gain in the case of the first information layer 2; and a gain setting unit 177 for setting the gain in the case of the second information layer 4. A gain selector 178 corresponds to an output 117s from the layer selection system 117 to transmit a signal from the gain setting unit 176 or the gain setting unit 177. By employing the foregoing structure, an optimum tracking state with respect to the two information layers can be set.

Although this embodiment has a structure such that the information pits formed on the first substrate 1 are in the convex form when viewed from a position at which the light beam is made incident, the structure is not limited to this. The information pits may be formed as concave when viewed from a position at which the light beam is made incident. In the foregoing case, the directions of the information pits on the second substrate 3 are inverted so that a recording medium having a similar effect to that obtainable from this embodiment is obtained.

Specific structures of the information recording medium will now be described.

EXAMPLE 1

A method of manufacturing the optical information recording medium shown in FIG. 1 and an operation of recording and reproducing the optical information recording medium will now be described.

Polycarbonate resin was employed to form the first and second substrates 1 and 3, and a mold having a surface comprising information pits was used to perform injection molding so that the first and second substrates 1 and 3 were manufactured. The first substrate 1 had a diameter of 120 mm and a thickness of 1.2 mm and comprised, on the surface thereof, information pits arranged such that the shortest pit length was 0.83 $\mu$m, the pit depth was 100 nm and the track pitch was 1.6 $\mu$m. The information pits consisted of pit columns formed to conform to the EFM code. On the first substrate 1, there was formed an Au layer having a thickness of 10 nm by a sputtering method so that the first information layer 2 was formed.

The second substrate 3 had the same diameter and thickness as those of the first substrate 1, the second substrate 3 having information pits in the same form as those of the first substrate 1. To make the directions of the spirals of the first substrate 1 and the second substrate 3 to be the same when viewed from a position upon which the light beam 7 was made incident after adhesive-bonding, the direction of the spiral of the projection and pit column when viewed from the surfaces of the information pits of the second substrate 3 was inverted with respect to that of the first substrate 1. An Au film was formed to have a thickness of 100 nm by a sputtering method so that the second information layer 4 was formed. The information pits of the first and second substrates 1 and 3 were formed into concave when viewed from a position at which the pits exist.

The first substrate 1 was secured to the substrate support section 72 of the adhesive-bonding apparatus shown in FIG. 6, followed by using the resin applying nozzle 64 to apply the acrylic type ultraviolet curing resin material 80 to the upper surface of the first information layer 2. The second substrate 3 was placed on the substrate support section 66a of the adhesive-bonding apparatus. Then, the upper-portion support section 61 was moved downwards by the elevation section 63 to bring the same into contact with the spacer 79. While pressing the second substrate 3 from an upper position with a load of 5 kg, it was irradiated with light emitted from the light source (the ultraviolet lamp) 81. Thus, the resin material 80 was hardened so that the separation layers having a thickness of d5 was formed between the first information layer 2 and the second information layer 4.

Before the adhesive-bonding was performed, the thickness of the inner portion, intermediate portion and the outer portion of each substrate was previously measured to calculate the differences from those after adhesive-bonding. Thus, the thickness d5 of the separation layer 5 was obtained. As a result, the mean value of the thickness of the separation layer 5 was 65 $\mu$m with an accuracy of ±8 $\mu$m or less at each measurement position. The reflectance of the first information layer 2 at a wavelength of 780 nm was 27.5% and that of the second information layer 4 at a wavelength of 780 nm was 91.6%. The level of eccentricity between the information layers was 40 μm.

Information was reproduced from the foregoing recording medium with an optical system having a light source for emitting light having a wavelength of 780 nm and an objective lens adaptable to an optimum thickness of the base of 1.2 mm and having a numerical aperture (NA) of 0.5. A knife edge method was employed to perform focusing, while a push-pull method was employed to perform tracking. Focusing was performed by using the photodetector 146 shown in FIG. 13 and having a light receiving surface divided into four sections in such a manner that the light receiving surface of the photodetector 146 for obtaining a focus error signal was switched between the pull-in operation and the servo operation. Reproducing light had power of 1 mW when the signal was reproduced. As a result, it was confirmed that stable focusing operations were performed with respect to the first and second information layers 2 and 4 and focus jumping was stably performed. Note that the polarity of the tracking signal was switched between the information layers. An excellent eye pattern was observed in the obtained reproduced signal from both of the first and second information layers 2 and 4. Jitters of both signals were measured, thus resulting in excellent values to be obtained such that the standard deviation with respect to the width of the detection window was 8.4% in the case of the first information layer 2 and 8.7% in the case of the second information layer 4.

Then, the obtained recording medium was allowed to stand in a hot and wet environment, the temperature of which was 80=and the relative humidity was 80%, for 100 hours, followed by performing a similar experiment. Then, the signal was similarly evaluated. As a result, change in the shape was inhibited, information could stably be reproduced, and an excellent result was obtained in measuring jitters without considerable change.

As a result, the method according to the present invention is an effective method for manufacturing a recording medium having a plurality of information layers.

EXAMPLE 2

A structure of a recording medium capable of forming information more densely will now be described. Similarly to Example 1, polycarbonate resin was employed to form the first and second substrates 1 and 3, and a mold having a surface comprising information pits was used to perform injection molding so that the first and second substrates 1 and 3 were manufactured. The first substrate 1 had a thickness of 0.58 mm and comprised, on the surface thereof, information pits arranged such that the shortest pit length was 0.5 μm, the pit depth was 90 nm and the track pitch was 0.8 μm. On the first substrate 1, there was formed an Au layer having a thickness of 11 nm by a sputtering method so that the first information layer 2 was formed.

The second substrate 3 had the same thickness as that of the first substrate 1, the second substrate 3 having information pits in the same form as those of the first substrate 1. To make the directions of the spirals of the first substrate 1 and the second substrate 3 to be the same when viewed from a position near the light source after adhesive-bonding, the direction of the spiral of the projection and pit column when viewed from the surfaces of the information pits of the second substrate 3 was inverted with respect to that of the first substrate 1. An Au film was formed to have a thickness of 100 nm by a sputtering method so that the second information layer 4 was formed. To make the shape of the pit on the main reflecting surface after the second information layer 4 had been formed to be similar to that of the first substrate 1, the length of the shortest pit of the pits to be formed on the surface of the second substrate 3 was made to be 0.6 μm. However, the pitch of the pits and the track pitch were the same of those of the first substrate 1.

The first substrate 1 was secured to the substrate support section 72 of the adhesive-bonding apparatus shown in FIG. 6, followed by using the resin applying nozzle 64 to apply the acrylic type ultraviolet curing resin material 80 to the upper surface of the first information layer 2. The second substrate 3 was placed on the substrate support section 66a of the adhesive-bonding apparatus. Then, the upper-portion support section 61 was moved downwards by the elevation section 63 to bring the same into contact with the spacer 79. While pressing the second substrate 3 from an upper position with a load of 8 kg, it was irradiated with light emitted from the light source (the ultraviolet lamp) 81. Thus, the resin material 80 was hardened so that the separation layer 5 having a thickness of d5 was formed between the first information layer 2 and the second information layer 4.

Before the adhesive-bonding was performed, the thickness of the inner portion, intermediate portion and the outer portion of each substrate are previously measured to calculate the differences from those after adhesive-bonding. Thus, the thickness d5 of the separation layer 5 was obtained. As a result, the mean value of the thickness of the separation layer 5 was 52 μm with an accuracy of ±5 μm or less at each measurement position. The reflectance of the first information layer 2 at a wavelength of 680 nm was 28.2% and that of the second information layer 4 at a wavelength of 680 nm was 89.6%. The level of eccentricity between the information layers was 35 μm.

Information was reproduced from the foregoing recording medium with an optical system having a light source for emitting light having a wavelength of 680 nm and an objective lens adaptable to an optimum thickness of the base of 0.6 mm and having a numerical aperture (NA) of 0.6. A similar servo method to that employed in Example 1 was employed. As a result, it was confirmed that stable focusing operations were performed with respect to the first and second information layers 2 and 4 and focus jumping between the information layers was stably performed. Note that the polarity of the tracking signal was switched between the information layers. An excellent eye pattern was observed in the obtained reproduced signal from both of the first and second information layers 2 and 4. Jitters of the both signals were measured, thus resulting in excellent values to be obtained such that the standard deviation with respect to the width of the detection window was 7.6% in the case of the first information layer 2 and 8.0% in the case of the second information layer 4.

Then, the obtained recording medium was allowed to stand in a hot and wet environment, the temperature of which was 80° C. and the relative humidity was 80%, for 100 hours, followed by performing a similar experiment. Then, the signal was similarly evaluated. As a result, change in the shape was inhibited, information could stably be reproduced, and an excellent result was obtained in measuring jitters without considerable change.

EXAMPLE 3

An example of a recording medium having four information layers as shown in FIG. 5 will now be described.

Similarly to Example 1, polycarbonate resin was employed to form the first to fourth substrates 58, 60, 63 and 65, and a mold having a surface comprising information pits was used to perform injection molding so that the first to fourth substrates 58, 60, 63 and 65 were manufactured. Each of the first and third substrates had a thickness of 0.58 mm and comprised, on the surface thereof, information pits arranged such that the shortest pit length was 0.5 $\mu$m, the pit depth was 90 nm and the track pitch was 0.8 $\mu$m. On each of the first and third substrates 58 and 63, there was formed an Au layer having a thickness of 11 nm by a sputtering method so that the first and third information layers 59 and 64 were formed.

Each of the second and fourth substrates 60 and 65 had a thickness of 0.4 mm, which was smaller than that of each of the first and third substrates 58 and 63, in order to reduce the overall thickness of the recording medium after adhesive-bonding, each of the second and fourth substrates 60 and 65 having information pits having the same shapes as those of the first and second substrates 58 and 63 on the surface thereof. To make the directions of the spirals of the first and second substrates 58 and 63 and the second and fourth substrates 60 and 65 to be the same when viewed from a position near the light source after adhesive-bonding, the direction of the spiral of the information pit column of the second and fourth substrates 60 and 65 was inverted with respect to that of the first and second substrates 58 and 63. On the second and fourth substrates 60 and 65, an Au film was formed to have a thickness of 100 nm by a sputtering method so that the second and fourth information layers 61 and 66 were formed. To make the shapes of the pits on the main reflecting surfaces after the second and fourth information layers 61 and 66 had been formed to be similar to those of the first and third substrates 58 and 63, the shortest length of the pit among the pits to be formed on the surfaces of the second and fourth substrates 60 and 65 was made to be 0.6 $\mu$m.

The first substrate 58 was secured to the substrate support section 72 of the adhesive-bonding apparatus shown in FIG. 6. The resin applying nozzle 64 was used to apply the acrylic ultraviolet curing resin material 80 to the upper surface of the first information layer 59. The second substrate 60 was placed to the substrate support portion 66a of the adhesive-bonding apparatus. Then, the elevation section 63 was operated to move the upper-portion support section 61 downwards to be brought into contact with the spacer 79. While applying a load of 8 kg from an upper position to the second substrate 60, it was irradiated with light emitted from the light source (the ultraviolet lamp) 81 so that the resin material 80 was hardened. As a result, the first separation layer 62 was formed between the first information layer 59 and the second information layer 61. The third substrate 63 was secured to the substrate support section 72 of the adhesive-bonding apparatus. Then, the resin applying nozzle 64 was used to apply the acrylic type ultraviolet curing resin material 80 to the upper surface of the third information layer 64. The fourth substrate 65 was placed on the substrate support section 66a of the adhesive-bonding apparatus. Then, the elevation section 63 was operated so that the upper-portion support section 61 was moved downwards to be brought into contact with the spacer 79. While applying a load of 8 kg to the fourth substrate 65 from an upper position, it was irradiated with light emitted from the light source (the ultraviolet lamp) 81 so that the resin material 80 was hardened. Thus, a second separation layer 67 was formed between the third information layer 64 and the fourth information layer 66.

Before the adhesive-bonding operation was performed, the thickness of each of the inner portion, the intermediate portion and the outer portion was measured to calculate the difference from that after the adhesive-bonding process. Thus, the thicknesses of the first and second separation layers 62 and 67 were obtained, thus resulting in that the mean thicknesses of the first and second separation layers 62 and 67 were 50 $\mu$m and 53 $\mu$m, respectively. The accuracy at each measurement position was within ±7 $\mu$m. In the foregoing case, the reflectance of each of the first and third information layers 59 and 64 at wavelength of 680 nm was 28.5%, and that of the second and fourth information layers 61 and 66 at wavelength of 680 nm was 88.7%. The levels of eccentricity between the information layers of the first and second mediums 101 and 103 each having two layers were excellent values, that is, 30 $\mu$m and 28 $\mu$m, respectively. Then, the first medium 101 was secured to the substrate support section 72 of the adhesive-bonding apparatus. The resin applying nozzle 64 was used to apply the acrylic type ultraviolet curring resin material 105 to upper surface of the second substrate 60 of the first medium. The second medium 103 was placed on the substrate support section 66a of the adhesive-bonding apparatus. Then, the elevation section 63 was operated so that the upper-portion support section 61 was moved downwards to be brought into contact with spacer 79. While applying a load of 10 kg to the second medium 103 from an upper position, it was irradiated with enlarged light beam 106 emitted from the light source 81 so that the resin material 105 was hardend. Thus the first medium 101 and the second medium 103 are adhesive-bonded to each other via adhesive layer 68.

Information was reproduced from the foregoing recording medium by the optical system similar to that employed in Example 2 and the servo method. It was confirmed that a stable focusing operation was performed when two information layers were reproduced from either of the surface of the first and third substrates 58 and 63. Moreover, focus jumping between the information layers was stably performed. An excellent eye pattern was observed in the reproduced signal from either of the information layers. Jitters of each of the first to fourth information layers 59, 61, 64 and 66 were measured, thus resulting in excellent standard deviations with respect to the detection window width of 7.9%, 8.3%, 7.9% and 8.2%.

An experiment was performed such that the foregoing recording medium was allowed to stand in a hot and wet environment in which the temperature was 80° C. and the relative humidity was 80%, for 100 houres and then the signal was similarly evaluated. As a result, change in the shape was inhibited, information could stably be reproduced, and the measurement of jitters resulted in a satisfactory value without considerable change.

EXAMPLE 4

Figure 18:
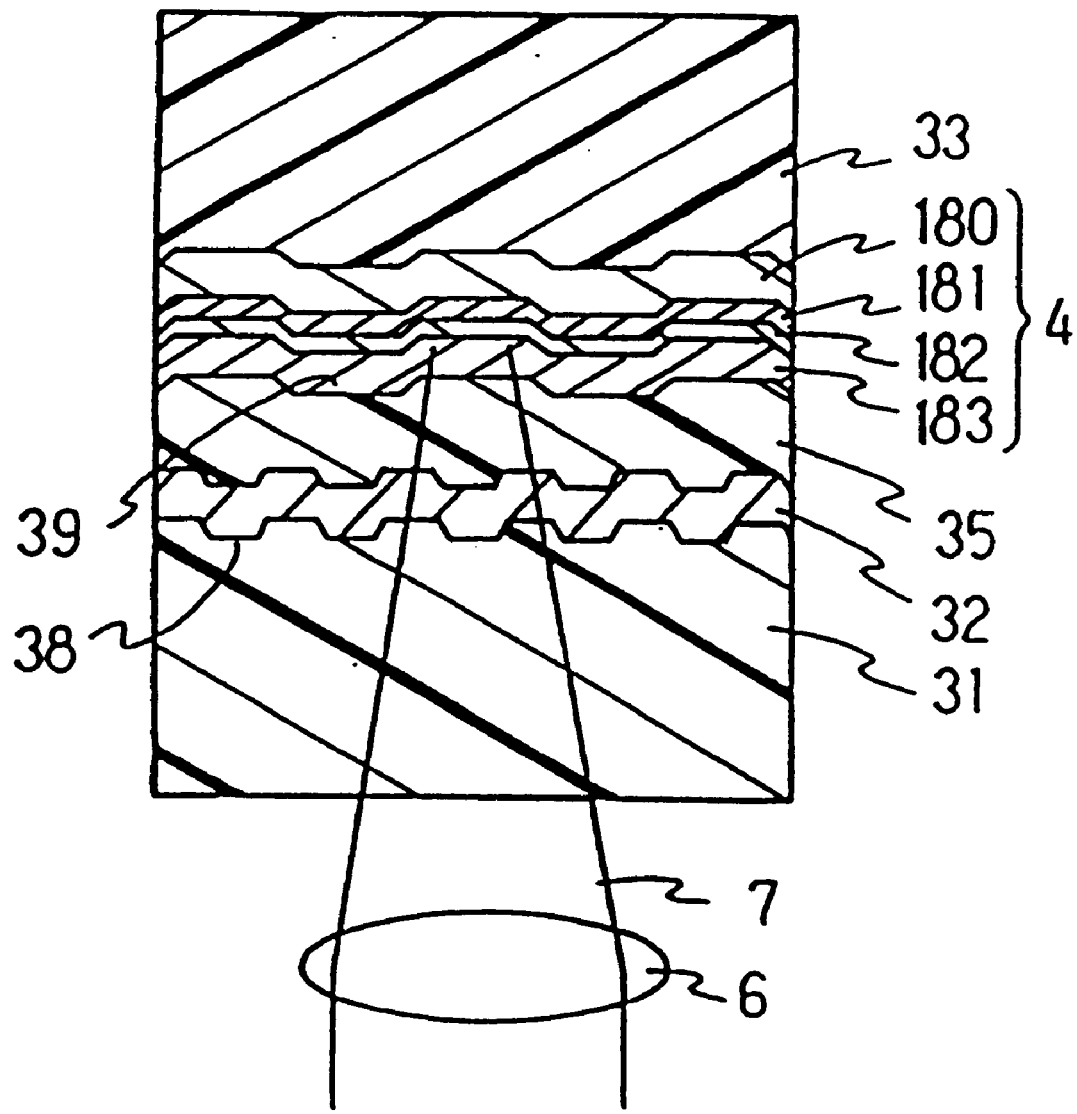
FIG. 18 is a cross sectional view showing another example of the optical information recording medium having a reproduction only information layer and a recording and reproducing information layer according to the present invention.

The specific structure of the optical information recording medium shown in FIG. 18 and recording and reproducing operations with the foregoing medium will now be described.

The first substrate 31 was made of polycarbonate resin and having, on the surface thereof, information pits formed in accordance with EFM modulation to correspond to information signals. The thickness d1of the first substrate 31 was 0.58 mm and the diameter was 120 mm. The information pits formed on the surface of the first substrate 31, were arranged in such a manner that the shortest length of the pit of the pits formed on its surface was 0.44 $\mu$m, the pitch depth was 90 nm and the track pitch was 0.74 $\mu$m. A ZnS layer having a thickness of 40 nm was formed on the surface of the first substrate 31 by the sputtering method so that the first information layer 32 was formed.

The second substrate 33 was made of polycarbonate resin and had guide grooves for tracking light beams on the surface thereof. The second substrate 33 had a thickness of 0.58 mm and a diameter of 120 mm. The pitch of the guide grooves formed on its surface was 1.48 µm, the width of the groove was the half of the pitch, and the depth was 70 nm. On the surface of the second substrate 33, there were formed a reflecting layer 180 made of Al, a ZnS—SiO$_2$ dielectric-material layer 181, a Ge—Sb—Te recording thin film layer 182 and a ZnS—SiO$_2$ dielectric-material layer 183 stacked sequentially. Thus, the second information layer 34 was formed.

The first substrate 31 was secured to the substrate support section 72 of the adhesive-bonding apparatus shown in FIG. 6. The resin applying nozzle 64 was used to apply the ultraviolet curing type resin material 80 to the upper surface of the first information layer 32. The second substrate 33 was placed on the substrate support section 66a of the adhesive-bonding apparatus. Then, the elevation section 63 was operated to downwards move the upper-portion support section 61 to be brought into contact with the spacer 79. While applying a load to the second substrate 33 from an upper position, it was irradiated with light emitted from the light source (the ultraviolet lamp) 81. Thus, the resin material 80 was hardened so that the separation layer 35 was formed between the first information layer 32 and the second information layer 34. The mean thickness of the separation layer 35 was 40 µm with an accuracy of within ±8 µm or better at each measurement position. Note that the thickness d1 of the first substrate 31 was 0.6 mm, which was the optimum thickness of the base for the objective lens 6 for converging the light beam 7. The arrangement was determined in such a manner that the optimum point was made to be the central position of the separation layer 35. In the foregoing case, the reflectance of the first information layer 32 at a wavelength of 680 nm was 10% and the reflectance of the second information layer 34 at a wavelength of 680 nm was 17%.

Recording and reproducing of information to and from the foregoing recording medium were evaluated using an optical system comprising a light source for emitting light having a wavelength of 680 nm and an objective lens having numerical aperture (NA) of 0.6 adaptable to the optimum base thickness of 0.6 mm, the evaluation being performed at a linear velocity of 6 m/s. Note that the power of the reproducing beam was 1 mW when the signal was evaluated. As a result, a stable focusing operation was performed with respect to the first and second information layers 32 and 34. Moreover, focus jumping between information layers was stably performed. As the tracking method, a phase difference method which is suited to the reproduction of a information pits with a narrow track pitch, was used for the first information layer 32, and a push-pull method, which is suited to a guiding groove, was used for the second information layer 34. An excellent eye pattern was observed in the reproduced signal from the first information layer 32. Jitters of each mark were measured, thus resulting in a standard deviation of jitters with respect to the detection window width for the code signal of 8.4%.

EFM signals having a shortest mark length of 0.6 µm were recorded on both land portions and groove portions of the guide grooves on the second information layer 34. As a result of irradiation with light modulated between recording power of 10 mW and deletion power of 5 mW, excellent eye pattern was observed in each case. The amplitude of the longest mark 11 T was similar to that obtainable from the first information layer 32. Measured jitters resulted in excellent values of 9.7% in the land portion and 9.5% in the groove portion. The foregoing information signals could be repeatedly rewritten. Note that the foregoing characteristics were equally observed from the inner portion to the outer portion of the substrate.

An experiment was performed such that the foregoing recording medium was allowed to stand in a hot and wet environment in which the temperature was 80° C. and the relative humidity was 80%, for 100 houres and then the signal was similarly evaluated. As a result, change in the shape was inhibited, information could stably be reproduced, and the measurement of jitters resulted in a satisfactory value without considerable change.

As a result, it can be said that the foregoing method is an effective method of manufacturing a recording medium having a plurality of information layers.

EXAMPLE 5

Figure 19:
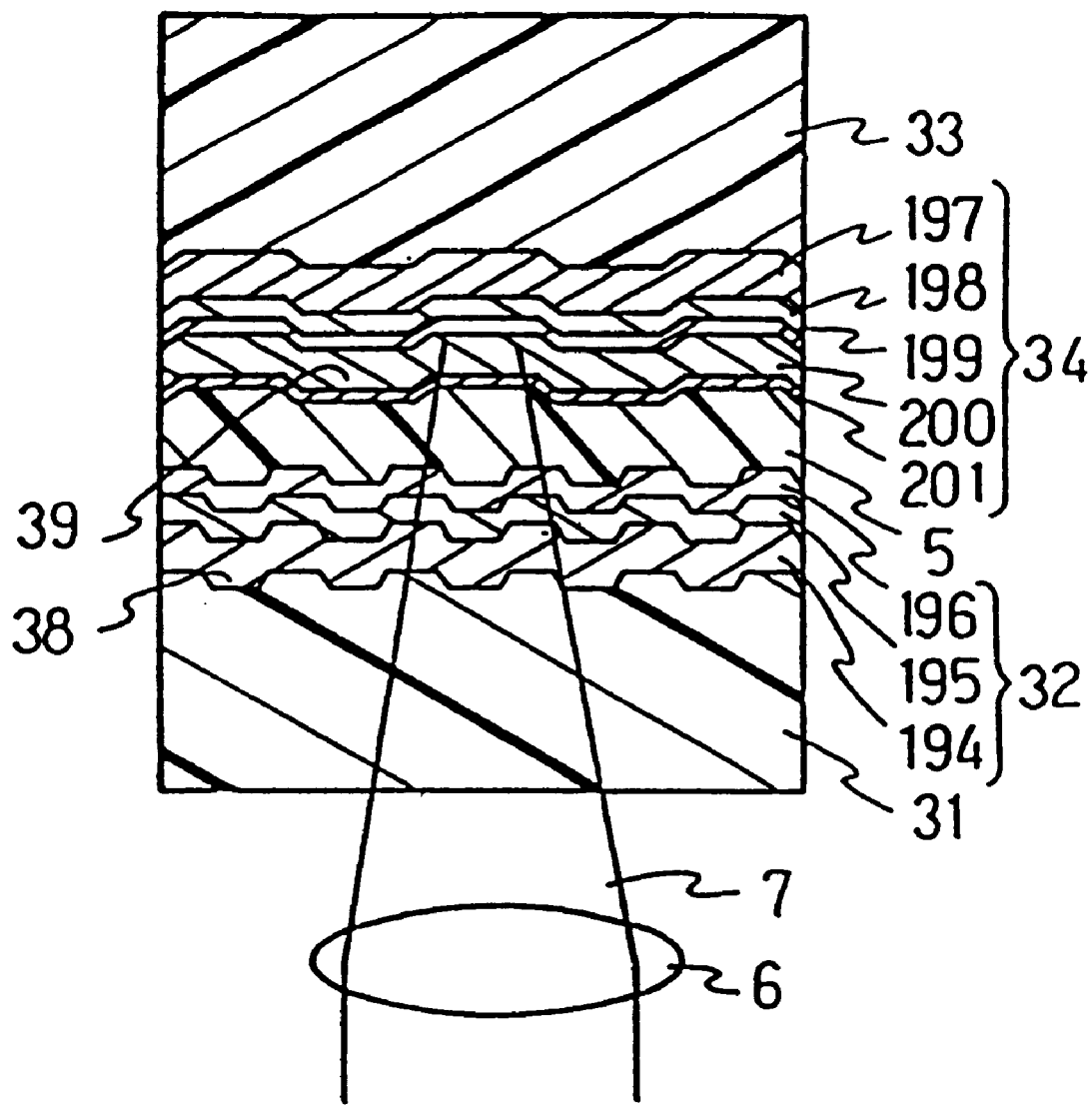
FIG. 19 is a cross sectional view showing still another example of the optical information recording medium having a reproduction only information layer and a recording and reproducing information layer according to the present invention.

The specific structure of the optical information recording medium shown in FIG. 19 and operations for recording and reproducing information to and from the same will now be described.

The first substrate 31 was made of polycarbonate resin and had, on the surface thereof, information pits formed in accordance with EFM modulation to correspond to information signals. The thickness d1 of the first substrate 31 was 0.58 mm and the diameter of the same was 120 mm. The shortest length of the pit of the information pits on the first substrate 31 was 0.44 µm, the pit depth was 90 nm and the track pitch was 0.74 µm. On the surface of the first substrate 31, there were formed sequentially by the sputtering method, a dielectric-material layer 194 having a thickness of 140 nm and made of ZnS—SiO$_2$, a dielectric layer 195 having a thickness of 30 nm and made of SiO2 and a dielectric-material layer 196 having a thickness of 140 nm and made of ZnS—SiO$_2$. Thus, the first information layer 32 was formed.

The second substrate 33 was made of polycarbonate resin and had guide grooves for tracking light beams. The second substrate 33 had a thickness of 0.58 mm and a diameter of 120 mm. The pitch of the guide grooves formed on the surface of the second substrate 33 was 1.1 µm and the depth of the groove was 50 nm. The second substrate 33 had, on the surface thereof, a reflecting layer 198 having a thickness of 50 nm and made of Au, a ZnS—SiO$_2$ dielectric-material layer 198 having a thickness of 50 nm, a Ge—Sb—Te recording thin film layer 199 having a thickness of 10 nm, a ZnS—SiO$_2$ dielectric-material layer 200 having a thickness of 20 nm and a semitransparent reflecting layer 201 having a thickness of 14 nm and made of Au, stacked sequentially. Thus, the second information layer 34 was formed.

The first substrate 31 was secured to the substrate support section 72 of the adhesive-bonding apparatus shown in FIG. 6. The resin applying nozzle 64 was used to apply the ultraviolet curing type resin material 80 to the upper surface of the first information layer 32. The second substrate 33 was placed on the substrate support section 66a of the adhesive-bonding apparatus. Then, the elevation section 63 was operated to downwards move the upper-portion support section 61 to be brought into contact with the spacer 79. While applying a load to the second substrate 33 from an upper position, it was irradiated with light emitted from the light source (the ultraviolet lamp) 81. Thus, the resin material 80 was hardened so that the separation layer 35 was formed between the first information layer 32 and the second information layer 34. The mean thickness of the separation layer 35 was 43 μm with an accuracy of within ±9 μm or better at each measurement position. Note that the thickness of each substrate was 0.58 mm. The objective lens 6 for converging the light beam 7 was adapted to an optimum base thickness of 0.6 mm. The arrangement was determined in such a manner that the optimum point was made to be the central position of the separation layer 35. In the foregoing case, the reflectance of the first information layer 32 at a wavelength of 680 nm was 17% and the reflectance of the second information layer 34 at a wavelength of 680 nm was 45%.

Recording and reproducing of information to and from the foregoing recording medium were evaluated by using an optical system comprising a light source for emitting light having a wavelength of 680 nm and an objective lens having numerical aperture (NA) of 0.6 adaptable to the optimum base thickness of 0.6 mm, the evaluation being performed at a linear velocity of 1.3 m/s. Note that the power of the reproducing beam was 1 mW when the signal was evaluated. As a result, a stable focusing operation was performed with respect to the first and second information layers 32 and 34. Moreover, focus jumping between information layers was stably performed. As the tracking method, a phase difference method was used for the first information layer 32, and a push-pull method was used for the second information layer 34. An excellent eye pattern was observed in the reproduced signal from the first information layer 32. Jitters of each mark were measured, thus resulting in a standard deviation of jitters with respect to the detection window width for the code signal of 8.1%.

EFM signals having a shortest mark length of 0.6 μm were recorded on both land portions and groove portions of the guide grooves on the second information layer 34. As a result of irradiation with light modulated between recording power of 19 mW and deletion power of 9 mW, excellent eye pattern was observed in each case. The amplitude of the longest mark 11 T was similar to that obtainable from the first information layer 32. Measured jitters resulted in 8.3%. The foregoing information signals could be repeatedly rewritten. Note that the foregoing characteristics were equally observed from the inner portion to the outer portion of the substrate.

An experiment was performed such that the foregoing recording medium was allowed to stand in a hot and wet environment in which the temperature was 80° C. and the relative humidity was 80%, for 100 houres and then the signal was similarly evaluated. As a result, change in the shape was inhibited, information could stably be reproduced, and the measurement of jitters resulted in a satisfactory value without considerable change.

EXAMPLE 6

Figure 20:
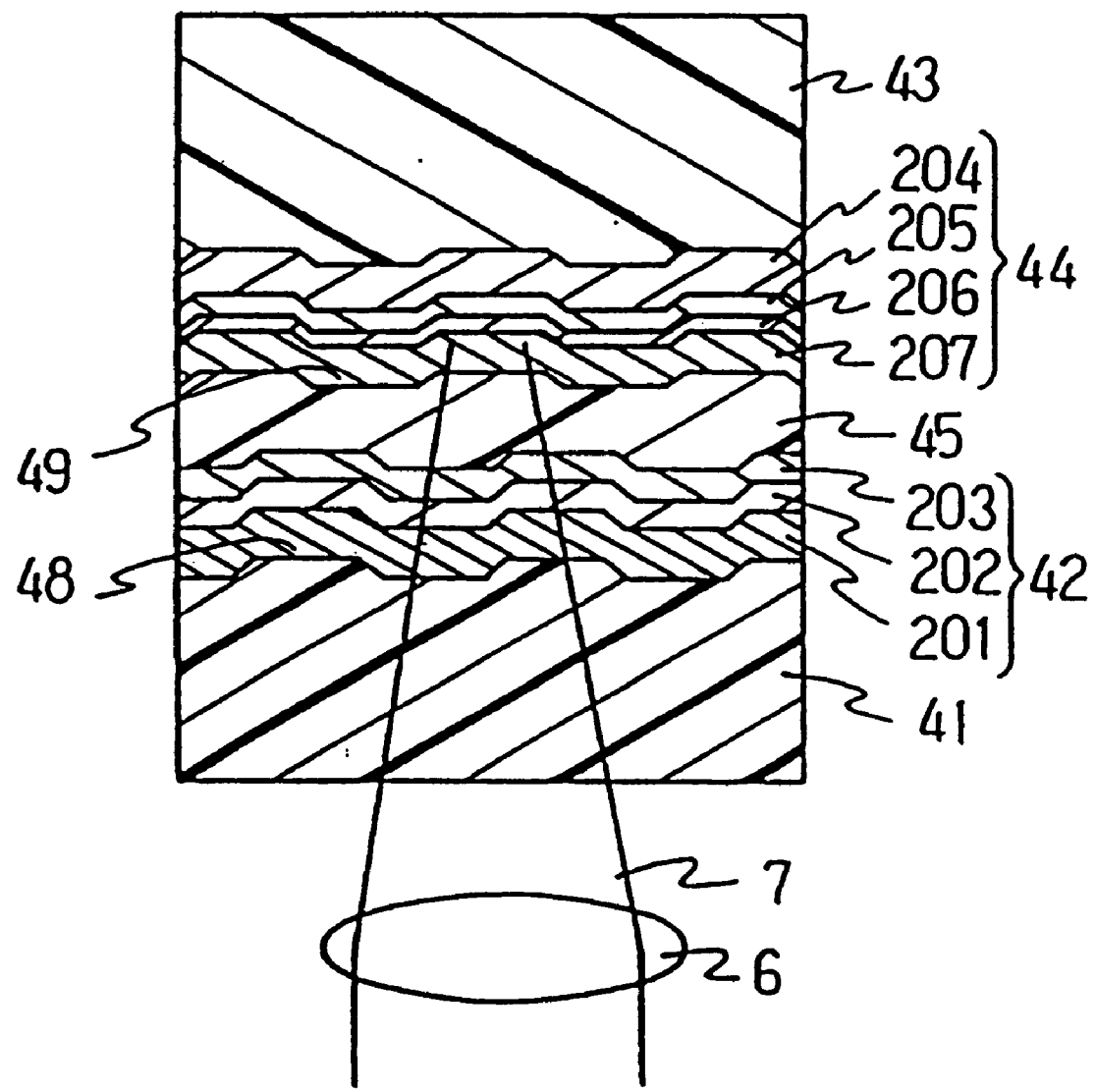
FIG. 20 is cross sectional view showing another example of the optical information recording medium having two recording and reproducing information layers according to the present invention.
Figure 21A:
FIG. 21 shows the process for manufacturing a conventional optical information recording medium.
Figure 21B:
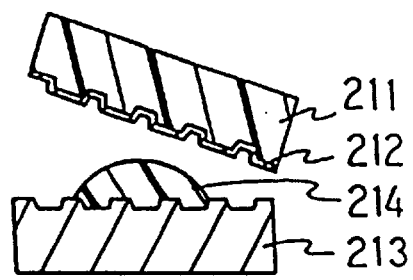
Figure 21C:
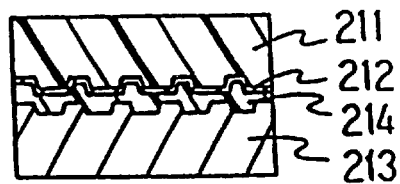
Figure 21D:
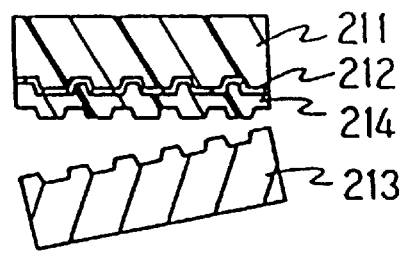
Figure 21E:
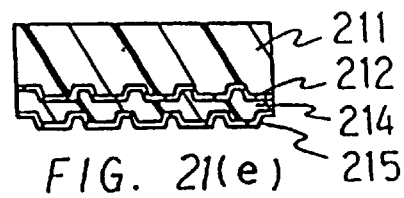
Figure 21F:
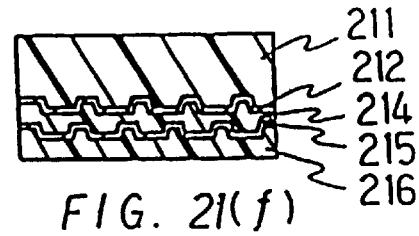

The specific structure of the optical information recording medium shown in FIG. 20 and operations for recording and reproducing information to and from the same will now be described.

The first substrate 41 was made of polycarbonate resin and having, on the surface thereof, guide grooves for tracking light beams. The thickness of the first substrate 41 was 0.58 mm and the diameter of the same was 120 mm. The pitch of the guide, grooves formed on the surface of the first substrate 41 was 1.48 μm, the width of the groove was the half of the track pitch, and the depth of the groove was 50 nm. The first substrate 41 had, on the surface thereof, a ZnS—SiO$_2$ dielectric-material layer 201 having a thickness of 110 nm, a Ge$_2$Sb$_2$Te$_5$ recording thin film layer 202 having a thickness of 10 nm and a ZnS—SiO$_2$ dielectric-material layer 203 having a thickness of 80 nm stacked sequentially. Thus, a reloadable first information layer 42 was formed.

The second substrate 43 was made of polycarbonate resin and had, on the surface thereof, guide grooves for tracking light beams. The thickness of the second substrate 43 was 0.58 mm and the diameter of the same was 120 mm. The pitch of the guide grooves formed on the surface of the second substrate 43 was 1.48 μm, the width of the groove was the half of the track pitch and the depth of the groove was 50 nm. On the surface of the second substrate 43, there were formed a reflecting layer 204 having a thickness of 100 nm and made of Al, ZnS—SiO$_2$ dielectric-material layer 205 having a thickness of 18 nm, Ge$_2$Sb$_2$Te$_5$ recording thin film layer 206 having a thickness of 25 nm and ZnS—SiO$_2$ dielectric-material layer 207 having a thickness of 110 nm stacked sequentially. Thus, the second information layer 44 was formed.

The first substrate 41 was secured to the substrate support section 72 of the adhesive-bonding apparatus shown in FIG. 6. The resin applying nozzle 64 was operated to apply the ultraviolet curing resin material 80 to the upper surface of the first information layer 42. The second substrate 43 was placed on the substrate support section 66a of the adhesive-bonding apparatus. The elevation section 63 was operated to move the upper-portion support section 61 downwards to be brought into contact with the spacer 79. While applying a load to the second substrate 43 from an upper position, it was irradiated with light emitted from the light source (the ultraviolet lamp) 81. Thus, the resin material 80 was hardened so that the separation layer 45 was formed between the first information layer 42 and the second information layer 43. The mean thickness of the separation layer 45 was 40 μm with an accuracy of ±7 μm or better at each measurement point. Note that the thickness d1 of the first substrate 41 was adapted to be 0.6 mm, which was the optimum base thickness of the objective lens 6 for converging the light beam 7. The disposition was determined such that the foregoing optimum point was made to be the central position of the separation layer 45. In the non-recording state (a crystal state), the reflectance of the first information layer 42 was 19%, the transmissivity was 40% and the reflectance of the second information layer 44 was 17%.

Recording and reproducing of information to and from the foregoing recording medium were evaluated by using an optical system comprising a light source for emitting light having a wavelength of 680 nm and an objective lens having numerical aperture (NA) of 0.6 adaptable to the optimum base thickness of 0.6 mm, the evaluation being performed at a linear velocity of 6 m/s. Note that the power of the reproducing beam was 1 mW when the signal was evaluated. As a result, a stable focusing operation was performed with respect to the first and second information layers 42 and 44. Moreover, focus jumping between information layers was performed stably.

EFM signals having a shortest mark length of 0.6 μm were recorded on both land portions and groove portions of the guide grooves on the first information layer 42. As a result, an excellent eye pattern was observed when the recording power was 14 mW. The amplitude of the longest mark 11 T was similar to that obtainable from the first information layer 42. Measured jitters resulted in excellent values such that it was 10.8% in the land portion and 11.3% in the groove portion.

EFM signals having a shortest mark length of 0.6 μm were recorded on both land portions and groove portions of the guide grooves of the second information layer 44. An excellent eye pattern was observed at each portion when the recording power was 18 mW. Measured jitters resulted in 11.7% in the land portion and 12.1% in the groove portion which were lower than 13% which was one reference for reproducing information. Thus, it was confirmed that information could satisfactorily reproduced.

An experiment was performed such that the foregoing recording medium was allowed to stand in a hot and wet environment in which the temperature was 80° C. and the relative humidity was 80%, for 100 hours and then the signal was similarly evaluated. As a result, change in the shape was inhibited, information could stably be reproduced, and the measurement of jitters resulted in a satisfactory value without considerable change.

As a result, it can be said that the method according to the present invention is an effective method of manufacturing a recording medium having a plurality of information layers.

What is claimed is:

1. An optical information recording medium comprising:
    a first information layer and a second information layer,
    wherein the first information layer is formed on an information pits surface corresponding to information signals,
    the second information layer is formed on a substrate having, on one side thereof, guide grooves for tracking, on which information can be recorded by a light beam passed through the first information layer, and
    the second information layer comprises at least four thin films.

2. The optical information recording medium according to claim 1, wherein the second information layer comprises a reflecting layer, a first dielectric-layer, a recording layer and a second dielectric-layer.

3. The optical information recording medium according to claim 2, wherein the recording layer is a phase change recording thin film.

4. An optical information recording medium comprising:
    a first information layer, a second information layers, and a transparent separation layer formed between the first and second information layer, wherein
    the first information layer comprises three thin films,
    the second information layer comprises four thin films, and information can be recorded on the second information layer by a light beam passed through the first information layer.

5. The optical information recording medium according to claim 4, wherein the first information layer comprises a first dielectric layer, a first recording layer, and a second dielectric-layer.

6. The optical information recording medium according to claim 5, wherein the second information layer comprises a third dielectric layer, a fourth dielectric-layer, and a reflecting layer.

7. The optical information recording medium according to claim 6, wherein the first and second recording layers are phase change recording thin films.

* * * * *